United States Patent
Park

(10) Patent No.: US 11,315,779 B1
(45) Date of Patent: Apr. 26, 2022

(54) DUAL-FREQUENCY RF ION CONFINEMENT APPARATUS

(71) Applicant: Bruker Scientific LLC, Billerica, MA (US)

(72) Inventor: Melvin Andrew Park, Billerica, MA (US)

(*) Notice: Subject to any disclaimer, the term of this patent is extended or adjusted under 35 U.S.C. 154(b) by 0 days.

(21) Appl. No.: 17/208,705

(22) Filed: Mar. 22, 2021

(51) Int. Cl.
| | |
|---|---|
| *H01J 49/42* | (2006.01) |
| *G01N 27/623* | (2021.01) |
| *H01J 49/40* | (2006.01) |
| *H01J 49/06* | (2006.01) |

(52) U.S. Cl.
CPC .......... *H01J 49/422* (2013.01); *G01N 27/623* (2021.01); *H01J 49/062* (2013.01); *H01J 49/065* (2013.01); *H01J 49/40* (2013.01); *H01J 49/4235* (2013.01)

(58) Field of Classification Search
CPC ........ H01J 49/422; H01J 49/40; H01J 49/062; H01J 49/065; H01J 49/4235; G01N 27/623
USPC ...................................................... 250/290
See application file for complete search history.

(56) References Cited

U.S. PATENT DOCUMENTS

| | | | |
|---|---|---|---|
| 5,572,035 A | 11/1996 | Franzen | |
| 6,107,628 A | 8/2000 | Smith et al. | |
| 6,693,276 B2 | 2/2004 | Weiss et al. | |
| 7,391,021 B2 | 6/2008 | Stoermer et al. | |
| 2013/0175441 A1* | 7/2013 | Zanon | H01J 49/065 250/288 |
| 2015/0364309 A1* | 12/2015 | Welkie | H01J 49/40 250/282 |

OTHER PUBLICATIONS

Gerlich, Dieter, "Inhomogeneous RF Fields: A Versatile Tool for the Study of Processes With Slow Ions", Advances in Chemical Physics Series, vol. LXXXII, 1992.

* cited by examiner

*Primary Examiner* — Kiet T Nguyen
(74) *Attorney, Agent, or Firm* — Benoit & Côté Inc.

(57) ABSTRACT

A mass spectrometric system comprises an RF-device for transversely confining ions in an ion region using: (a) a first set of electrodes arranged parallel to one another along a direction of ion travel to define a first transverse boundary of the ion region, and that are supplied with a first RF-voltage such that opposite phases of the first RF-voltage are applied to adjacent electrodes of the first set; and (b) a second set of electrodes arranged parallel to one another along said direction of ion travel to define a second transverse boundary of the ion region, and that are supplied with a second RF-voltage such that opposite phases of the second RF-voltage are applied to adjacent electrodes of the second set, the first and second transverse boundaries being opposite each other in a transverse direction of the ion region and the first and second RF voltages having different frequencies.

26 Claims, 13 Drawing Sheets

DUAL-FREQUENCY RF ION CONFINEMENT APPARATUS

FIELD OF THE INVENTION

The invention relates to Radio Frequency (RF) devices with stacked electrodes for transversely confining ions, e.g., RF-ion guides and RF-ion traps, and to systems incorporating these RF-devices, e.g., mass spectrometric systems.

BACKGROUND OF THE INVENTION

RF-devices comprising a stack of apertured electrodes are well known in the field of mass spectrometry and ion mobility. Opposite phases of an RF voltage (typically at a frequency of several hundred kilohertz up to several megahertz, and a voltage of a few hundred volts) are applied alternately to the apertured electrodes which are arranged along a longitudinal axis of the RF-device. The forces generated by the RF-potentials repel ions passing through the apertures of the electrodes. The effect of the so-called pseudo-potential generated by the RF-potentials and different methods of operation are described, for example, in an article by Gerlich (1992; Advances in Chemical Physics Series, Vol. LXXXII; title: "INHOMOGENEOUS RF FIELDS: A VERSATILE TOOL FOR THE STUDY OF PROCESSES WITH SLOW IONS") and in U.S. Pat. No. 5,572,035. The ions are prevented from escaping through the intermediate spaces between the electrodes and are thus transversely confined inside the RF-device. DC potentials or transient DC potentials can be additionally applied to the apertured electrodes to actively drive ions forward along the axis of the RF-device or trap the ions inside the RF-device along the axis.

RF-devices with stacked electrodes include RF-ion funnels which are commonly used to capture dispersed ions at a wide open entrance and guide them to a narrow opening at the exit (U.S. Pat. No. 6,107,628) as well as RF-ion tunnels comprising electrodes with constant aperture area which can be used for generating ion packets and actively driving them through the RF-ion tunnel by applying multiphase low-frequency or transient DC voltages to the electrodes or as collision cells with an active forward drive (U.S. Pat. No. 6,693,276).

Another example is disclosed in U.S. Pat. No. 7,391,021. Here, the RF-devices each comprise a stack of apertured electrodes that allow an ion beam to be shaped in the cross-sectional profile so that it corresponds to the acceptance profile of a section downstream of the device. For this purpose, at least some of the apertured electrodes do not have circular openings, but instead have openings which shape the cross-sectional profile of the emerging ion beam in the desired manner. It is possible to obtain elliptical beam cross sections, divided ion beams or ion beams focused to the shape of a fine thread at the output of the stack of apertured electrodes.

The pseudo-potential generated by the RF-devices applied to the stacked electrodes comprises ripples of potential wells between the stacked electrodes. These pseudo-potential wells tend to collect ions, especially under the presence of a damping gas, and can only be overcome by additional axial forces acting on the ions. However, these devices are unable to transversely confine ions inside an RF-device with stacked electrodes and drive them along the axis of the RF-device without or with minimized disturbance from the pseudo-potential wells along the axis.

SUMMARY OF THE INVENTION

The invention provides an RF-device for transversely confining ions in an ion region. The RF-device comprises a first set of electrodes that are arranged parallel to one another along a direction of ion travel (longitudinal axis) to define a first transverse boundary of the ion region, and that are supplied with a first RF-voltage such that opposite phases of the first RF-voltage are applied to adjacent electrodes of the first set. The RF-device further comprises a second set of electrodes that are arranged parallel to one another along said direction of ion travel to define a second transverse boundary of the ion region, and that are supplied with a second RF-voltage such that opposite phases of the second RF-voltage are applied to adjacent electrodes of the second set. The first and second transverse boundaries are opposite each other in a transverse direction of the ion region and the first RF voltage and the second RF voltage have different frequencies. The RF-device comprises first and second generators that are configured to generate the first and second voltages of different frequencies.

In an exemplary embodiment, the frequencies applied to the two electrode sets differ by more than 10%, and may differ by more than 20%, or more advantageously by more than 50%. The ratio between the two frequencies is preferably not a whole number so as to minimize resonant excitation of ion motion, for example $f1/f2=1.2/0.86$ or $1.8/1.2$. The average of the two frequencies may be between 0.3 and 10 MHz, and preferably around 1 MHz. The operating pressure may be less than 5000 Pa, more preferably less than 1000 Pa, and is typically between 200 and 700 Pa.

The electrodes of each of the first and the second sets have a relative spacing S along the direction of ion travel and the first and second transverse boundaries have a relative distance D from each other in the transverse direction wherein a ratio D/S is preferably less than 10 in at least one portion of the RF-device along the direction of ion travel, more preferably less than 5, most preferably between 1.5 and 3. A small ratio D/S has the advantage that the ions are not only confined in the ion region between the first and second boundaries, but also focused in the transverse direction to a mid-surface between the first and second boundaries. The spacing as well as the ratio D/S may be constant or may locally vary along the whole direction of the ion travel. The RF-device can for example have a large spacing or ratio D/S at an entrance whereas the spacing or ratio D/S is relatively smaller toward or at the exit. This variation allows a larger storage volume in the entrance and stronger focusing to the mid-surface at the exit where ions are, for example, focused through an aperture to a subsequent pumping stage or analyzed according to mass or mobility. In one version of the invention, the effective pseudo-potential generated by the first and second electrodes is symmetric, and a Taylor expansion of the effective pseudo-potential comprises only even order terms. In an asymmetric version, the Taylor expansion of the combined pseudo-potentials comprises even and odd order terms, wherein the first order term (linear term) is associated with a constant force towards one of the electrode sets. The amplitudes of first and second RF voltage can be different, especially to adjust the effective pseudo-potential to the symmetric version.

In an exemplary embodiment of the invention, the electrodes of the first set have a relative spacing equal to a relative spacing of the electrodes of the second set, and, relative to the electrodes of the first set, a positioning of the electrodes of the second set along the axis is offset by a distance that is preferably equal to half of said relative spacing.

The application of two different frequencies to two opposing electrode sets, in particular in combination with a spatial offset between the sets, has the advantage that two pseudo-potential distributions are generated independently from each other such that pseudo-potential wells between the electrodes along the axis are minimized. The RF-device according to the invention enables focusing ions toward the mid-surface between the first and second boundaries without inhibiting their motion in the mid-surface, in particular along the longitudinal axis, whereas prior art teaches to focus ions toward a line without inhibiting their motion along the line.

In a first embodiment, the electrodes of the first and second set together encompass a cross-sectional profile of the ion region. The electrodes of the first set can be at least partially interdigitated with the electrodes of the second set in an overlap area. The overlap area is preferably less than 20% of the inner boundary of the ion region.

In a second embodiment, the electrodes of the first and second set do not completely encompass the ion region. Additional electrodes or electrode segments of the first and second electrodes are supplied and provided with repelling DC-potentials to transversely confine the ions in the ion region in sections of the ion region that are not bordered by the electrodes of the first or second set. The repelling DC-potentials applied to the additional electrodes or the electrode segments preferably have a DC offset relative to DC-potentials applied to proximate electrodes of the first and second set. The DC offset can be constant or can vary along the axis.

Multiple electrodes of the first and second set can have a rod-like portion with a round cross-section. A ratio between the diameter of the round cross-section and the spacing of the rod-like portions is preferably about two to three (2/3).

The cross-sectional profile of the ion region can be convex, i.e., for any given two points inside the cross-sectional profile, all points along a line segment between the two points lie also inside the cross-sectional profile. A convex cross-sectional profile can, for example, be round, oval, elongated rectangular or elongated rectangular with rounded lateral portions. However, the cross-sectional profile can also be non-convex, e.g., shaped like a horseshoe, serpentine or shaped like the space between a closed outer boundary and a closed inner boundary, such as an annulus. An advantage of a non-convex cross-sectional profile is that the influence of one charged ion on another will be reduced and the number of ions which can be trapped is increased.

The ion region can have an elongate cross-sectional profile perpendicular to the axis with a long dimension and a short dimension. Furthermore, the elongate cross-sectional profile can have a reflective symmetry through a plane containing the longitudinal axis of the ion region and the long dimension. The cross-sectional profile of the ion region can be constant or vary along the longitudinal axis of the ion region. The cross-sectional profile at an entrance of the RF-device can be larger than at the exit, e.g., to form a funnel for collecting ions and spatially focusing them at the exit of the ion region.

The RF-device can further comprise a DC voltage generator that is configured to apply additional DC-potentials to the electrodes of the first and second set and/or the additional electrodes. The additional DC-potentials are not applied to transversely trap ions in the ion region. These additional DC-potentials can be repelling and applied to electrodes of the first and/or second set near the entrance and exit of the ion region such that ions are temporarily trapped inside the ion region along the longitudinal axis. By applying the additional DC-potentials, ions can, for example, be axially accelerated into or inside the gas-filled RF-device to induce fragmentation by collision with gas molecules. Ions or fragment ions can be trapped or actively driven through the RF-device by axial fields generated by the additional DC-potentials. The additional DC-potentials can be time-dependent, e.g., to first trap and then release ions from the RF-device or to vary the fragmentation energy for collision induced dissociation (CID) of ions in time. The additional DC-potentials can be transient DC-potentials for generating a travelling wave inside the RF-device. The DC-potentials applied to electrodes of the RF-device can be generated via a resistor chain or by multiple DC power supplies.

The RF-device can be used for different purposes, e.g., as an ion guide, an ion trap, a fragmentation cell, an ion mobility separator, especially a trapped ion mobility separator, or an ion accelerator/reflector, e.g., in a time-of-flight mass analyzer.

The invention further provides a mass spectrometric system comprising an ion source, the RF-device according to the invention and a mass analyzer.

The ion source can generate ions, for example using spray ionization (e.g., electrospray (ESI) or thermal spray), desorption ionization (e.g., matrix-assisted laser desorption/ionization (MALDI) or secondary ionization), chemical ionization (CI), photo-ionization (PI), electron impact ionization (EI), or gas-discharge ionization.

The mass spectrometric system can further comprise an ion guide and/or an ion trap between functional components wherein the RF-device is part of the ion guide and/or ion trap. As described above, DC-potentials can be applied to the electrodes of the first and/or second set of the RF-device to temporarily trap ions along the longitudinal axis of the ion region and/or to urge ions through the ion region.

The mass analyzer can, for example, be one of a time-of-flight analyzer (preferably with orthogonal injection of ions), an electrostatic ion trap, an RF ion trap, an ion cyclotron frequency ion trap and a quadrupole mass filter. The mass analyzer is preferably a time-of-flight mass analyzer and comprises at least one of an accelerator for orthogonally injecting ions, a flight path and a reflector wherein the RF-device can be incorporated in at least one of these components of the time-of-flight mass analyzer.

The mass spectrometric system can further comprise an ion mobility separator between the ion source and the mass analyzer wherein the ion mobility separator comprises the RF-device according to the invention. The ion mobility separator can for example be a TIMS (trapped ion mobility separator) that preferably comprises a gas flow along the longitudinal axis of the ion region and a DC voltage generator. The DC voltage generator is configured to supply DC-potentials to the electrodes of the first and second set of the RF-device for generating an electric DC field gradient along the axis which counteracts the force of the gas flow such that ions are trapped and separated by ion mobility during an accumulation phase. The DC voltage generator is further configured for varying the DC-potentials applied to the electrodes of the first and second set such that ions are released from the ion mobility separator over time as a function of ion mobility during an elution phase. The ion region of the DC-device incorporated in the TIMS preferably has an elongate cross-sectional profile perpendicular to the longitudinal axis with a long dimension and a short transversal dimension.

The mass spectrometric system can further comprise a fragmentation cell between the ion source and the mass analyzer wherein the fragmentation cell comprises the RF-device according to the invention. The fragmentation cell is preferably located between the ion mobility separator and the mass analyzer. The ions can for example be fragmented in the fragmentation cell by collision induced dissociation (CID), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) or fragmentation by reactions with highly excited or radical neutral particles. The fragmentation cell can for example comprise a DC voltage generator that is configured to apply DC-potentials to the electrodes of the first and/or second set along the axis such that ions are accelerated inside and/or into the gas filled RF-device and fragment ions resulting from collision induced dissociation are urged through the ion region.

The mass spectrometric system may further comprise a mass filter that can be located upstream of the fragmentation cell, in particular between the ion mobility separator and the fragmentation cell. An additional mass filter can be located upstream of the ion mobility separator. Furthermore, a separation device, like liquid chromatography devices or electrophoretic devices, can be part of or coupled to the mass spectrometric system.

DETAILED DESCRIPTION OF THE INVENTION

A first embodiment of a RF-device according to the invention is shown in FIGS. 1A-1G.

Figure 1A:
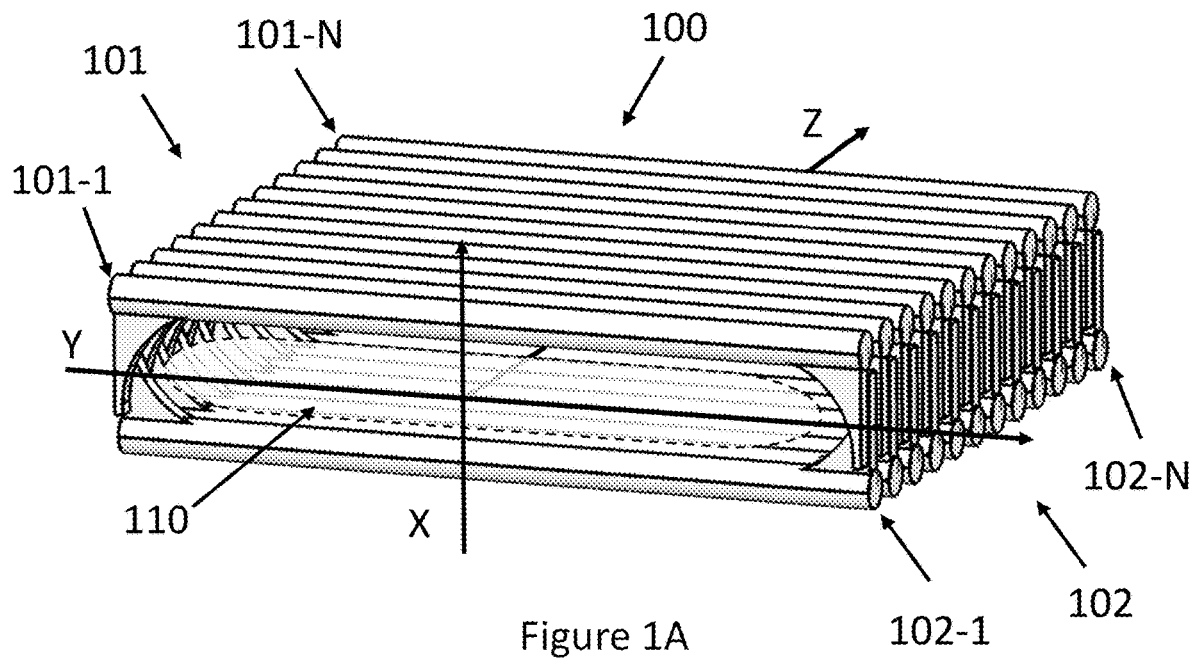
FIG. 1A shows a first embodiment of a RF-device according to the invention that is part of a trapped ion mobility separator (TIMS).

FIG. 1A shows a RF device 100 that is part of a trapped ion mobility separator (TIMS). The RF-device 100 comprises an upper set of electrodes 101 and a lower set of electrodes 102 with electrodes 101-1 to 101-N and 102-1 to 102-N, respectively. The upper electrodes 101 are interdigitated with the lower electrodes 102 along the z-direction, i.e., portions of the electrodes of the lower set 102 are located between portions of the electrodes of the upper set 101. The RF-device 100 has an ion region 110 having an elongate cross-sectional profile perpendicular to the z-direction with a long dimension along the y-direction and a short dimension along the x-direction. The electrodes of the first and second set (101, 102) together encompass the convex cross-sectional profile of the ion region 110.

Ions enter from one side of the ion region 110 and will eventually travel to the opposite side. The direction of travel along the ion region 110 is defined as the longitudinal axis of RF-device 100 (z-direction). The ions are molecular constituents of a sample of interest, which have been ionized and introduced to the ion region 110, typically from an ionization source of a known type, such as an electrospray or MALDI (matrix-assisted laser desorption ionization) type ion source or CI (chemical ionization) ion source.

In a trapped ion mobility separator (TIMS), ions are temporarily trapped inside the ion region 110 along the longitudinal axis of the RF-device at mobility dependent positions. Separation of the ions by ion mobility is done with the use of opposing forces (first/second force) along the longitudinal axis of the RF-device which produce counteracting velocity components. At least one of the first and second axial forces has an effect on the ions that is ion mobility dependent, and at least one of the first and second axial forces varies spatially along the longitudinal axis of the RF-device.

During an accumulation phase, the opposing forces are preferably balanced such that, for each ion species of interest, an equilibrium point of zero velocity exists within the ion region 110. Since a mobility-dependent force has a different influence on ion species of different mobility, the spatial position along the longitudinal axis of the RF-device for which the net velocity of an ion species is zero will depend on the mobility K of that ion species. During a subsequent elution phase, the trapped ion species are eventually released from the ion region 110 by changing one or both of the forces such that the velocity components change, and the ion species have one after the other no equilibrium point in the ion region 110 anymore and elute from the ion region depending on their mobility K. This relative change in the opposing axial forces may be progressive, such that ion species of increasing or decreasing mobility K successively exit the TIMS. In addition to the opposing axial forces, the ions are transversely confined in the ion region 110 of the RF-device.

As discussed in more detail below, the first force can be generated by a gas flow with constant velocity, while the second force can be generated by an electric DC field gradient that increases along the z direction from zero to a maximum value at a plateau. The RF-device provides the electric DC field gradient, as well as a transversal confinement of the ions in the ion region 110. The trapped ion mobility separator (TIMS) is operated at a pressure between 10 and 5000 Pa, typically between 200 to 700 Pa.

Figure 1B:
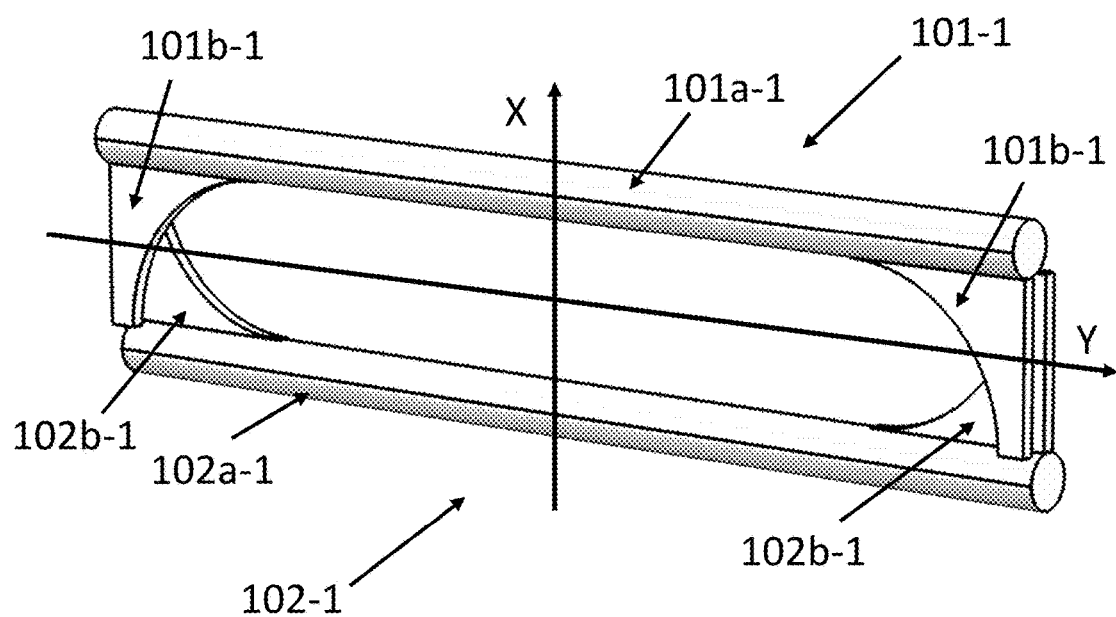
FIG. 1B shows first upper and lower electrodes of the RF-device of FIG. 1A.

FIG. 1B shows the first upper electrode 101-1 and the first lower electrode 102-1 which are both significantly longer in the long dimension (y-direction) than in the short dimension (x-direction). Each electrode comprises an elongate portion (101a-1, 102a-1) and two extended portions (101b-1 and 102b-1) which are located at the ends of each electrode, extend in the x-direction and have a generally flat shape with a curved edge facing the ion region 110. The extended portions of the upper electrode 101-1 overlap partially with the extended portions of the lower electrode 102-1 in the x-y plane. In the present embodiment, the elongate portions are rod-like with a circular cross-section, although other electrode shapes may also be used, e.g., with a rounded cross-section only towards the ion region. The elongate portions of the upper and lower set define first and second transverse boundaries of the ion region 110. The extended portions define a left and right boundary of the ion region 110.

Figure 1C:
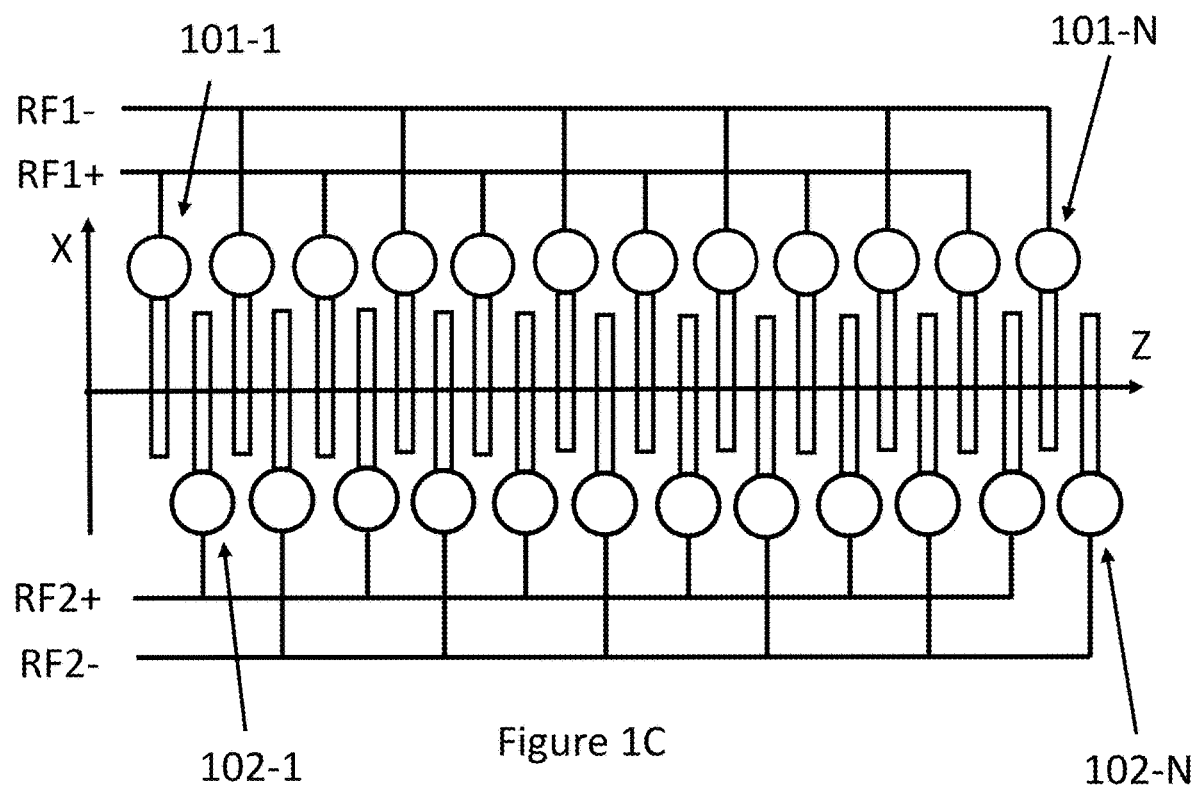
FIG. 1C shows a schematic side view of the upper and lower electrodes of the RF-device of FIG. 1A and the application of RF-potentials thereto.

FIG. 1C shows a schematic side view (x-z plane) of the upper electrodes 101 and the lower electrodes 102. In this embodiment, two different RF-potentials (RF1, RF2) with different frequencies are used, RF1 being applied to the electrodes 101 and RF2 being applied to the electrodes 102. As shown in the figure, the electrodes 101 alternate with the electrodes 102 along the z-direction, and for each of the RF-potentials, two opposite phases are used. For example, a first phase of RF1 (RF1+) is applied to every odd-numbered upper electrode (101-1, 101-3, . . . ), while an opposite phase, RF1− (which is 180° out of phase with RF1+) is applied to the even-numbered upper electrodes (101-2, 101-4, . . . ). Similarly, a first phase of RF2 (RF2+) is applied to every odd-numbered lower electrode (102-1, 102-3, . . . ), while an opposite phase, RF2−, is applied to the even-numbered lower electrodes (102-2, 102-4, . . . ). An important advantage of applying RF-potentials of two different frequencies to the electrode structures of both sides, and offsetting the electrode structures on both sides, is that substantially no pseudo-potential wells are produced inside the ion region, especially along the longitudinal axis. Ions are focused by the pseudo-potential (generated by applying the RF-potentials to the elongate portions) to the midsurface between the elongate upper and lower portions without inhibiting their motion in the mid-surface, in particular along the longitudinal axis. Focusing to this midsurface is important because mobility resolution of the TIMS separator increases with gas velocity and the gas flow velocity is highest in the mid-surface. The ions are further confined to the left and right by pseudo-potentials generated by applying the RF-potentials to the extended portions.

Figure 1D:
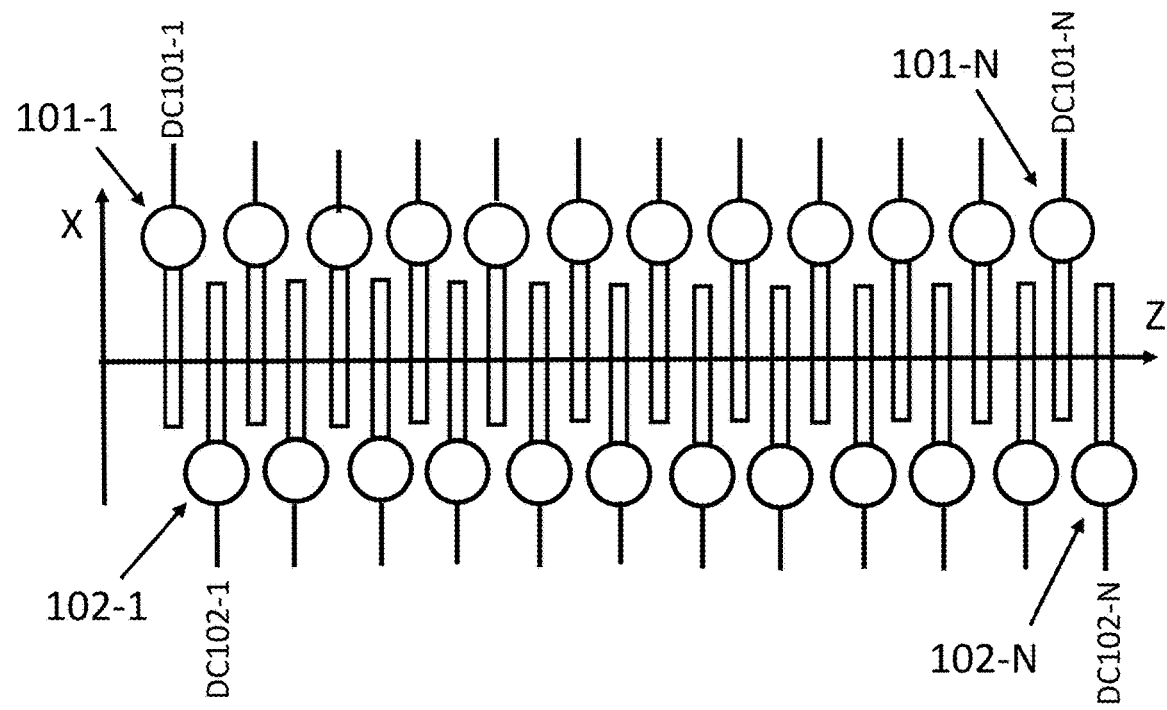
FIG. 1D shows a schematic side view of the upper and lower electrodes of the RF-device of FIG. 1A and the application of DC-potentials thereto.

FIG. 1D shows a schematic side view (x-z plane) of the upper electrodes 101 and the lower electrodes 102 and DC-potentials which are applied to the electrodes of both sets (101, 102). As shown in the figure, a first DC-potential DC101-1 is applied to the first upper electrode 101-1, while a DC-potential DC101-N is applied to the Nth upper electrode 1011-N. Similarly, a DC-potential DC102-1 is applied to a first lower electrode 102-1, and a DC-potential DC102-N is applied to the Nth lower electrode 102-N. Additional DC-potentials are applied to each of the other upper and lower electrodes. These DC-potentials are constant in time during the accumulation phase and varied during the elution phase and are used to create an electric DC field gradient along the z-direction for controlling ions in the ion region, as discussed in more detail below.

An example of this embodiment has the following parameters, although those skilled in the art will understand that this is just an example, and that the parameters may be varied according to the application. Although the operating pressure of the TIMS may range from 10-5000 Pa (0.1-50 mbar), in this specific example it is approximately 300 Pa (3 mbar). The ion region has a length in the z-direction of 100 mm, a width in the y-direction of 40 mm and a height in the x-direction of 4 mm. In this version, the number of upper electrodes 101 is 40 and the number of lower electrodes 102 is 40. The RF-potentials provide transversal confinement of the ions to the ion region in both the x and y directions, with RF1 having a frequency of 0.86 MHz and RF2 having a frequency of 1.2 MHz, or with RF1 having a frequency of 1.2 MHz and RF2 having a frequency of 1.7 MHz. The elongate portions are circular rod-shaped electrodes, with a diameter of approximately 2 mm, and a spacing from adjacent electrode structures (both above and below the ion region) of 3 mm. The elongate electrodes are preferably integrated in a printed circuit board (PCB) and are supplied with DC and RF potentials via leads on the PCB. Finally, the gas flow rate is approximately between 50 and 100 m/s.

Figure 1E:
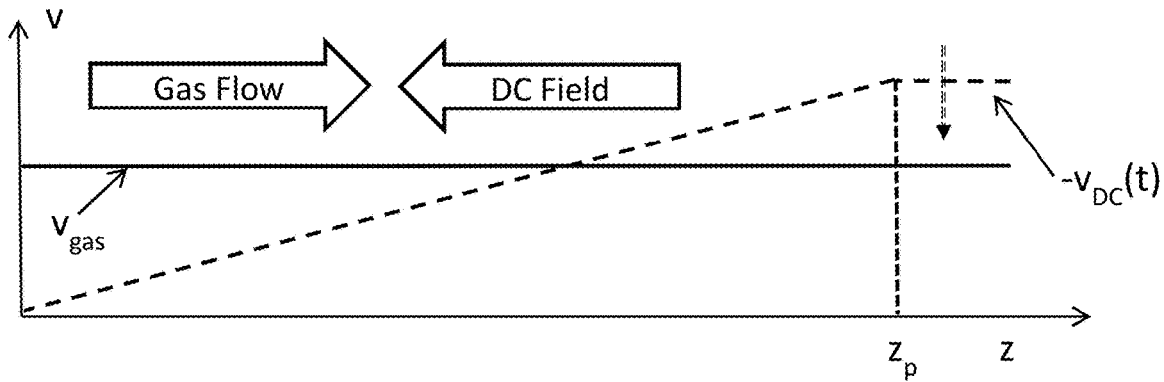
FIG. 1E is a graphical depiction of opposing axial forces on ions in the RF-device of FIG. 1A.
Figure 1F:
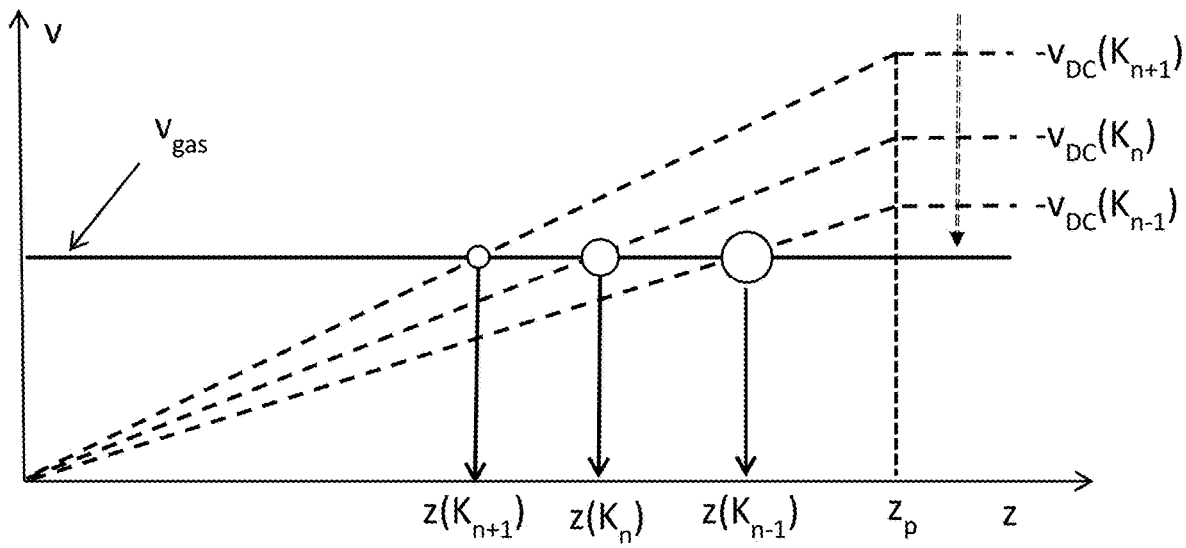
FIG. 1F is a graphical depiction showing the effective velocity components for different ion species in the RF-device of FIG. 1A.
Figure 1G:
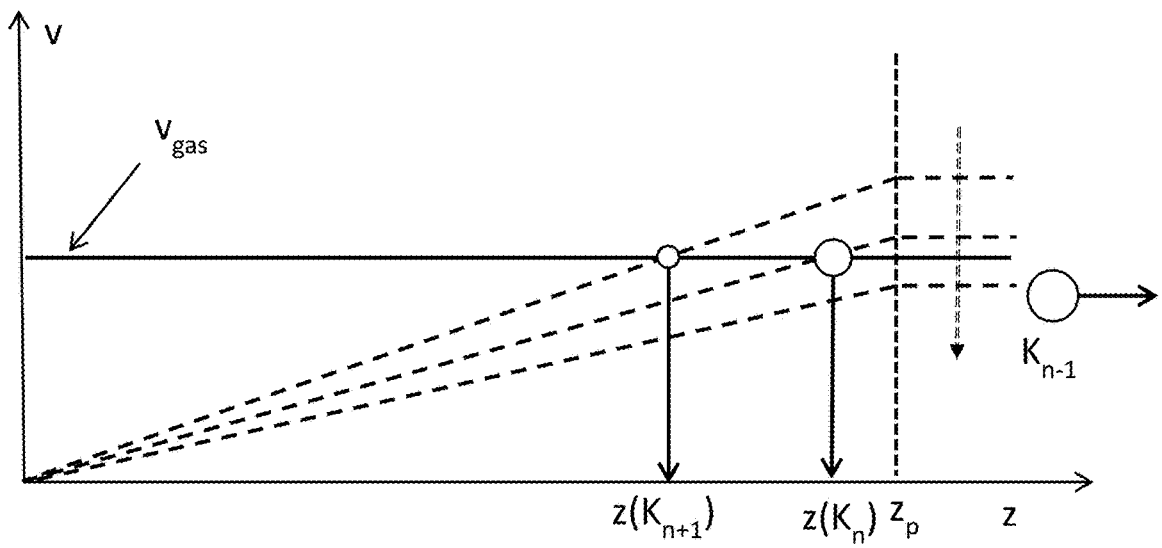
FIG. 1G is a graphical depiction like that of FIG. 1F that shows the elution of ions from the RF-device of FIG. 1A.

The effect of the opposing axial forces on the ions in the laterally extended TIMS is shown in FIGS. 1E-1G, each of which is a graph of velocity (or an effective velocity component) versus position along the z-axis. As shown in FIG. 1E, there is a substantially constant gas velocity, $v_{gas}$, pushing the ions through the ion region in the direction of the z-axis. Opposing this motion is an electric DC field $-E_{DC}(t)$ that has a spatial gradient along the z-axis, which produces the effective velocity component $-v_{DC}(t)$ shown in the figures, and which increases from zero to a maximum at longitudinal position $z_p$ at the plateau which, as discussed below, may be an elution point for ions at which the ions are not trapped anymore in the laterally extended TIMS. The negative value of the electric DC field is due to its directional opposition to the longitudinal force of the gas, and it is represented as a function of time because, in this embodiment, the strength of the electric DC field is lowered during elution of the different ion species.

FIG. 1F is similar to FIG. 1E but depicts the "effective" velocity component $-v_{DC}$ due to the counteracting electric DC field for each of several different ion species, $K_{n-1}$, $K_n$ and $K_{n+1}$. This "effective" velocity component is mobility dependent in the presence of a gas, and the corresponding $-v_{DC}$ gradient is therefore shown in the figure in broken lines for each of the ion species $K_{n-1}$, $K_n$ and $K_{n+1}$. These gradients represent the velocity components that would be imparted to the different ion species by the electric DC field $E_{DC}(t)$ in the absence of the gas flow $v_{gas}$. That is, $-v_{DC}$ represents the velocity component attributable to the electric DC field for an ion in a resting gas at a given pressure and temperature. This value is proportional to the strength of the electric DC field, and different for each ion species having a different mobility K (where $v_{DC}=K \cdot E_{DC}$). The "effective" velocity provided by the gas flow in the absence of the electric DC field is $v_{gas}$ for all ion species $K_{n-1}$, $K_n$ and $K_{n+1}$.

The electric DC field gradient along the z-axis results in a corresponding gradient for $-v_{DC}$ that is different for ion species of different mobility, as shown in FIG. 1F. During an initial accumulation phase for the ions, the magnitude of the electric DC field is such that, for each of the ion species of interest, $-v_{DC}$ is equal and opposite to the velocity component $v_{gas}$ imparted by the gas flow at a different position along the z-axis. Because of the different $-v_{DC}$ gradients of the different ion species, the ions of the different species will be separated from one another and trapped at different respective positions along the z-axis. The different ion species, $K_{n-1}$, $K_n$ and $K_{n+1}$, are represented in FIG. 1F by circles of different sizes, the larger circles corresponding to ion species of larger cross-section and thus of lower mobility K.

Following separation of the different ion species, the ions may be sequentially eluted from the laterally extended TIMS and directed to a downstream component of a hybrid IMS-MS system or to an ion detector. The elution is done by gradually reducing the magnitude of the electric DC field gradient, which correspondingly reduces the magnitudes of the $v_{DC}$ velocity component gradients, as shown in FIG. 1G. As these gradients are reduced, the point at which the counteracting velocity components $v_{gas}$ and $-v_{DC}$ cancel each other is shifted in the +z direction for each of the different ion species, toward the exit of the laterally extended TIMS. The structure of the electric field is such that the gradient increases in the +z direction until it reaches a plateau at the elution point $z_p$ along the z-axis. Since the ion trapping position is different for each of the different ion species, the shifting of these trapping positions by lowering of the electric DC field gradient results in each ion species arriving at the elution point $z_p$ at a different time. Upon arrival at the elution point, an ion species is no longer trapped by the counteracting velocity component and exits the laterally extended TIMS in the +z direction, as shown for ion species $K_{n-1}$ in FIG. 1G. In this way, the separated ion species are eluted from the laterally extended TIMS in a sequential manner, from low mobility to high mobility.

A second embodiment of a RF-device according to the invention is shown in FIGS. 2A-2E.

Figure 2A:
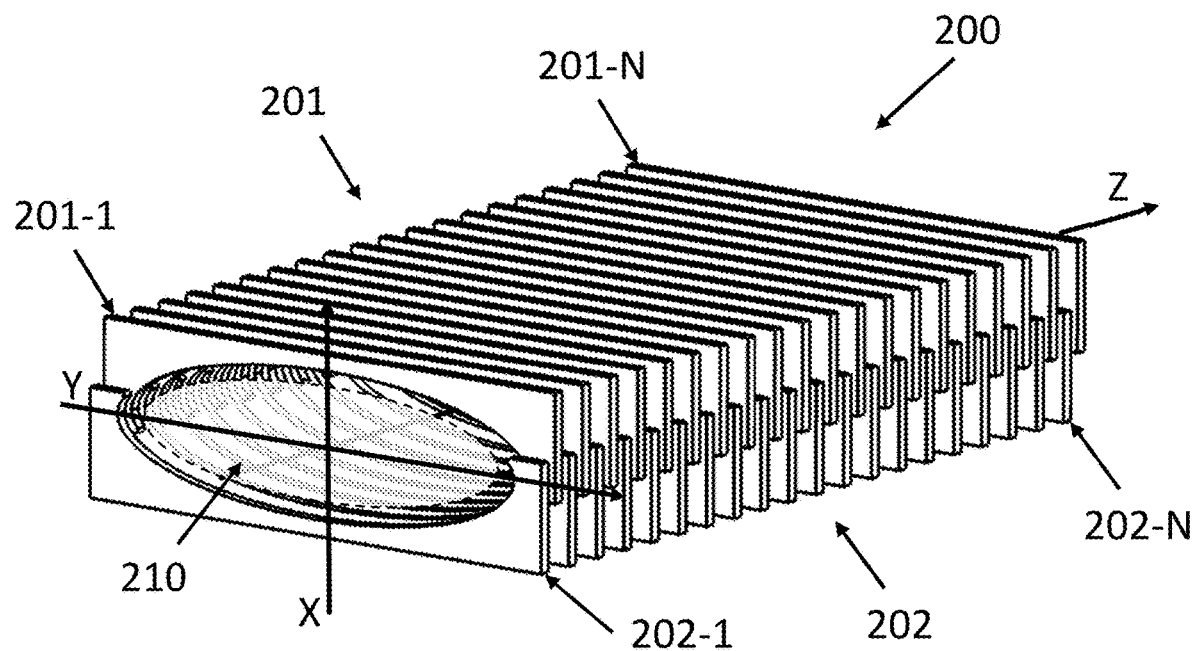
FIG. 2A shows a second embodiment of a RF-device according to the invention with simplified electrodes compared to the first embodiment.

FIG. 2A shows a RF device 200 that can also be part of a (laterally extended) trapped ion mobility separator (TIMS). Like the RF-device 100, the RF-device 200 comprises an upper set of electrodes 201 and a lower set of electrodes 202 with electrodes 201-1 to 201-N and 202-1 to 202-N, respectively. The upper electrodes 201 are interdigitated with the lower electrodes 202 along the z-direction and form the ion region 210. Like in the embodiment above, the cross-sectional profile of ion region 210 is convex and does not vary along the longitudinal axis of the RF-device.

Two different RF-potentials (RF1, RF2) with different frequencies are used, RF1 being applied to the electrodes 201 and RF2 being applied to the electrodes 202. The electrodes 201 alternate with the electrodes 202 along the z-direction, and for each of the RF-potentials, two opposite phases are used. A first phase of RF1 (RF1+) is applied to every odd-numbered upper electrode (201-1, 201-3, . . . ), while an opposite phase, RF1− (which is 180° out of phase with RF1+) is applied to the even-numbered upper electrodes (201-2, 201-4, . . . ). Similarly, a first phase of RF2 (RF2+) is applied to every odd-numbered lower electrode (202-1, 202-3, . . . ), while an opposite phase, RF2−, is applied to the even-numbered lower electrodes (202-2, 202-4, . . . ). The RF-potentials transversely confine ions to the ion region in both the x and y directions. The ion region 210 has an elongate cross-sectional profile perpendicular to the z-direction with a long dimension along the y-direction and a short dimension along the x-direction.

Like in the embodiment above, DC-potentials are also applied to the upper and lower electrodes (201, 202) for generating an electric DC field gradient which provides one of the opposing forces of the laterally extended TIMS. The other opposing force can again be generated by a gas flow with constant velocity.

Figure 2B:
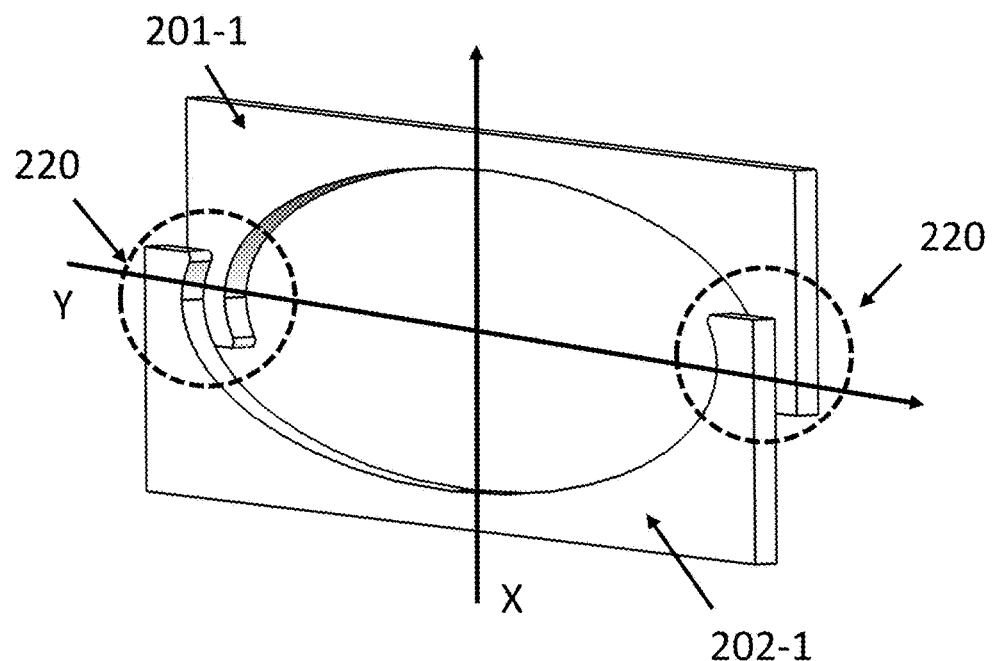
FIG. 2B shows first upper and lower electrodes of the RF-device of FIG. 2A.

FIG. 2B shows the first upper electrode 201-1 and the first lower electrode 202-1 which are both significantly longer in the long dimension (y-direction) than in the short dimension (x-direction). The upper and lower electrodes partially overlap at the regions 220 at both ends of the long dimension.

The upper and lower electrodes (201, 202) are simplified compared to the upper and lower electrodes (101, 102) of the embodiment above. The upper and lower electrodes (201, 202) have a uniform thickness which makes them easier and cheaper to produce. The upper and lower electrodes (201, 202) can be directly produced as metallized parts of printed circuit boards (PCB) or by laser cutting of metal plates wherein multiple PCB boards with electrodes or the metal plates are arranged in a stack along the axis. The thickness can for example be between 0.3 and 1 mm. Preferably, the thickness is about 0.5 mm and the spacing between the upper (and lower) electrodes is about 2.5 mm.

Figure 2C:
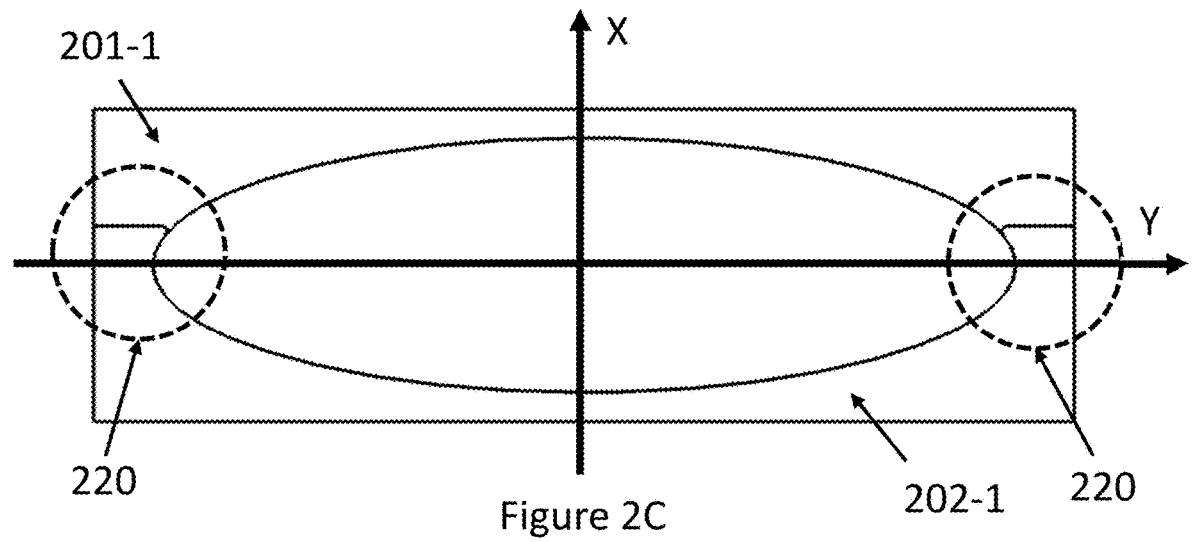
FIG. 2C shows the first upper and lower electrodes of the RF-device of FIG. 2A in the x-y plane.

FIG. 2C shows the first upper electrode 201-1 and the first lower electrode 202-1 in the x-y plane. Both electrodes have a common contour at both (left and right) overlapping regions 220. As shown, the cross-sectional profile is oval and symmetrical about the y-z plane. However, the cross-sectional profile can also be oval only near the overlapping regions 220 and can further comprise a long parallel portion in the middle. The cross-sectional profile can also comprise indentations such that it is non-convex. The curvature of the electrodes of each set 201 and 202 is preferably equal but can be different for the upper set 201 compared to the lower set 202 (except for the overlapping region 220). The curvature of the upper and lower electrodes can even be irregular, i.e., the curvature can comprise local irregular indentations.

Figure 2D:
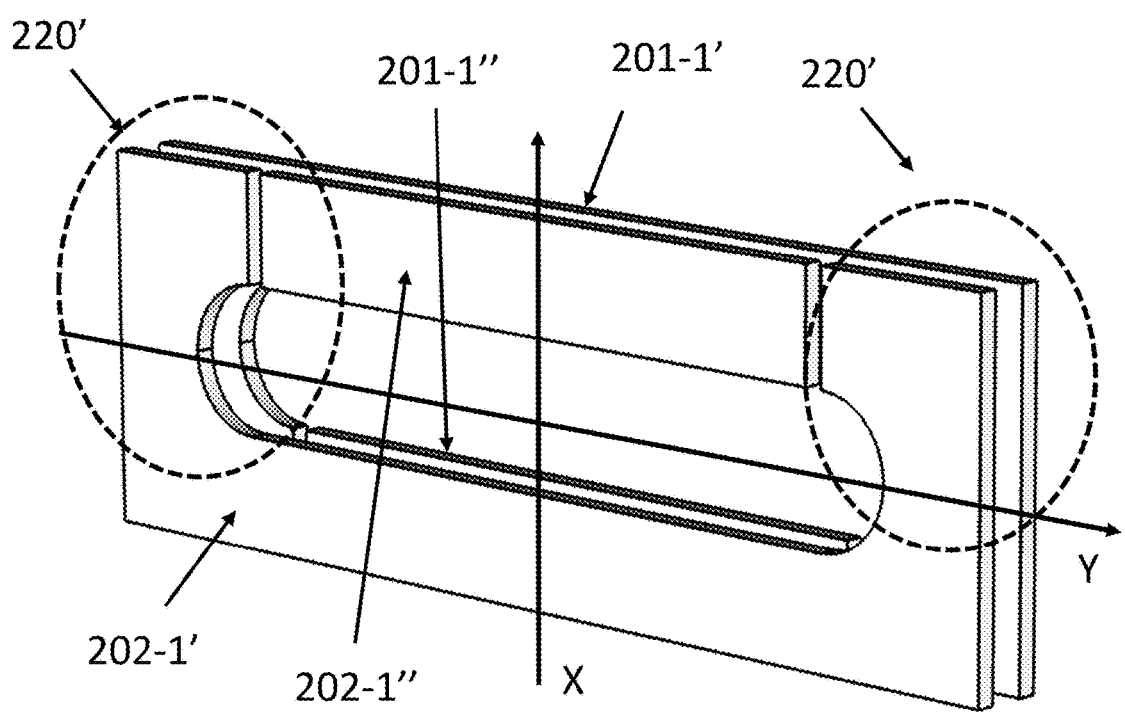
FIG. 2D shows an alternate configuration to that shown in FIG. 2A in which electrodes have a long parallel portion near the center of the ion region, and curved edges at the lateral extremes.

FIG. 2D shows an alternate configuration in which two electrodes (201-1', 202-1') of an upper set 201' and lower set 202', respectively, each having a long parallel portion near the center of the ion region, and curved edges at the lateral extremes. The two sets (201', 202') overlap at the regions 220' at both ends of the long dimension. Like the upper and lower electrodes (201, 202) of FIG. 2C, the electrodes of the sets 201' and 202' are simplified compared to the upper and lower electrodes (101, 102) shown in FIG. 1B. The upper and lower electrodes (201', 202') of the FIG. 2D embodiment have a uniform thickness, which makes them easier and cheaper to produce. The cross-sectional profile is rounded at both (left and right) overlapping regions 220' and comprises a long parallel portion in the middle. In contrast to the upper and lower electrodes (201, 202) of FIG. 2C, the upper and lower sets (201', 202') of FIG. 2D comprise additional electrodes 201-1" and 202-1". The additional electrode 201-1" bridges the gap of the upper electrode 201-1' between the overlapping regions 220'. The additional electrode 202-1" bridges the gap of the lower electrode 202-1' between the overlapping regions 220'. Two different RF-potentials having different frequencies are applied to the electrodes of the upper set 201' and the lower set 202', as described above for the upper and lower electrodes (201, 202) of FIG. 2C. As in that embodiment, DC-potentials can be applied to the upper electrodes 201' and to the lower electrodes 202' for generating an electric DC field gradient that provides one of the opposing forces of a laterally extended TIMS within which the electrodes might be used. The additional electrodes 201-1" and 202-1" are not supplied with RF-potentials, but with the same DC-potential of that electrode of the upper and lower set (201-1', 202-1') that resides in the same x-y plane and for which the additional electrode bridges the gap between the overlapping regions 220'. The additional electrodes 201-1" and 202-1" improve the homogeneity of the electric DC field gradient.

Figure 2E:
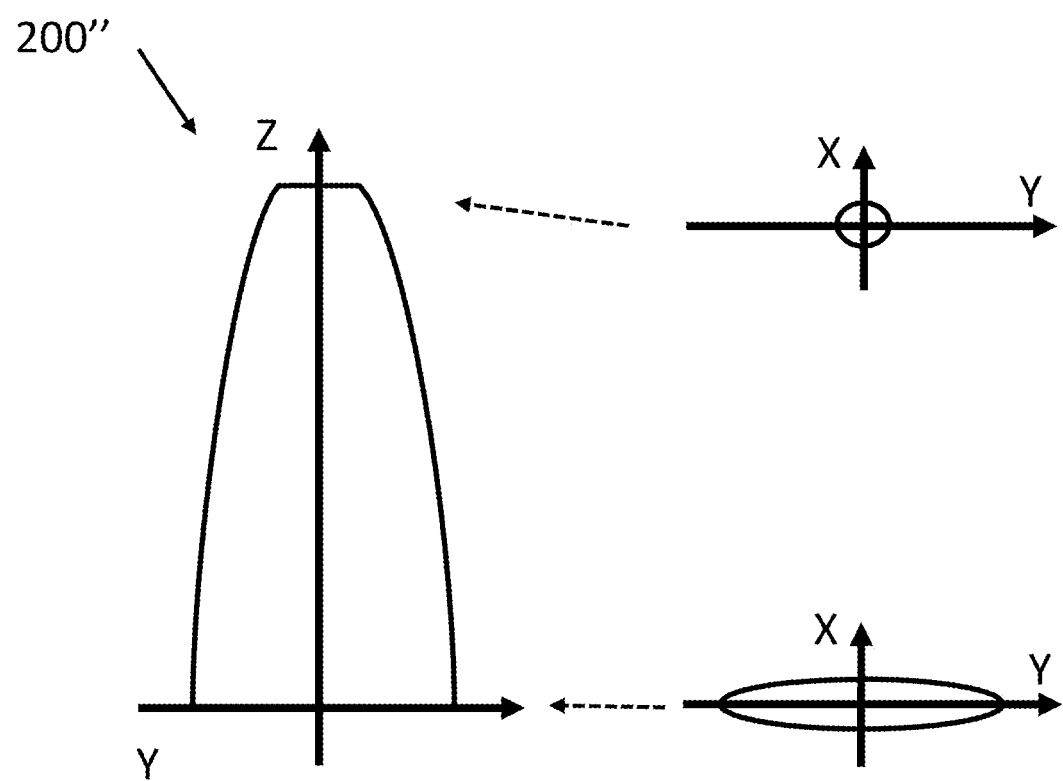
FIG. 2E is a schematic view of a version of the RF-device of FIG. 2A in which the cross-sectional profile of an ion region changes along the z-direction.

FIG. 2E shows a schematic view of an ion region of an RF-device 200" in the y-z plane as well as in the x-y plane at the entrance and exit of the RF-device 200". The RF-device 200" is similar to the RF-device 200 of FIG. 2A, but the cross-sectional profile is not constant along the z-direction, instead varying from an oval cross-sectional profile at the entrance to a circular cross-sectional profile at the exit. The extension of the ion region along the x-direction stays constant, while the extension along the y-direction decreases, which results in a spatial focusing of ions along the y-direction. However, the cross-sectional profile can vary also in both transverse directions.

A third embodiment of a RF-device according to the invention is shown in FIGS. 3A-3D.

Figure 3A:
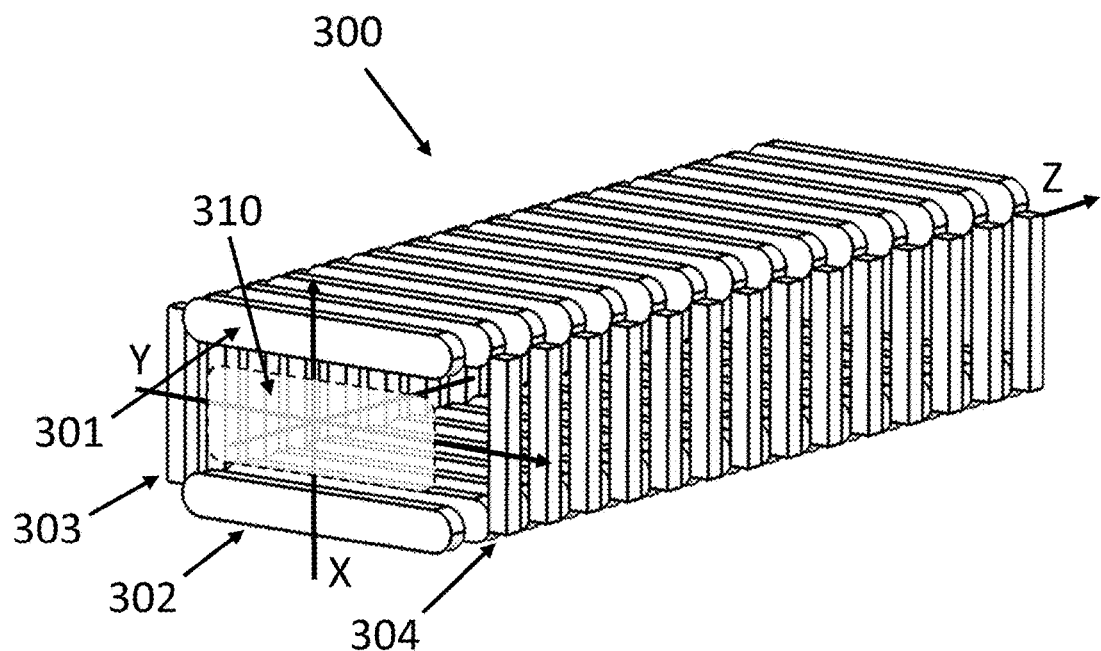
FIG. 3A shows a third embodiment of a RF-device according to the invention with DC-only electrodes for confining ions in one of the transverse directions.

FIG. 3A shows a RF device 300 which comprises an upper set of electrodes 301, a lower set of electrodes 302, a left set of electrodes 303 and a right set of electrodes 304 which are arranged in a stack along the axis (z-direction) of the RF-device 300. The RF-device 300 has an ion region 310 having a rectangular cross-sectional profile perpendicular to the z-direction, which is slightly more extended in the y-direction than in the x-direction and which does not vary along the longitudinal axis of the RF-device 300.

The electrodes of the upper set 301 are not interdigitated with the electrodes of the lower set 302 along the z-direction, but the electrodes of the left and right sets (303, 304) are interdigitated with the electrodes of the upper and lower sets (301, 302).

The electrodes of the four sets are rod-shaped. The rod-shaped electrodes of the upper and lower sets (301, 302) extend parallel to the y-direction. The rod-shaped electrodes of the left and right sets (303, 304) extend parallel to the x-direction along the left and right edges of the ion region 310. The electrodes can, for example, be manufactured as metallized parts of a PCB-board which are supplied with appropriate RF- and DC-potentials, and multiple such PCB boards with electrodes may be arranged in a stack along the axis.

Figure 3B:
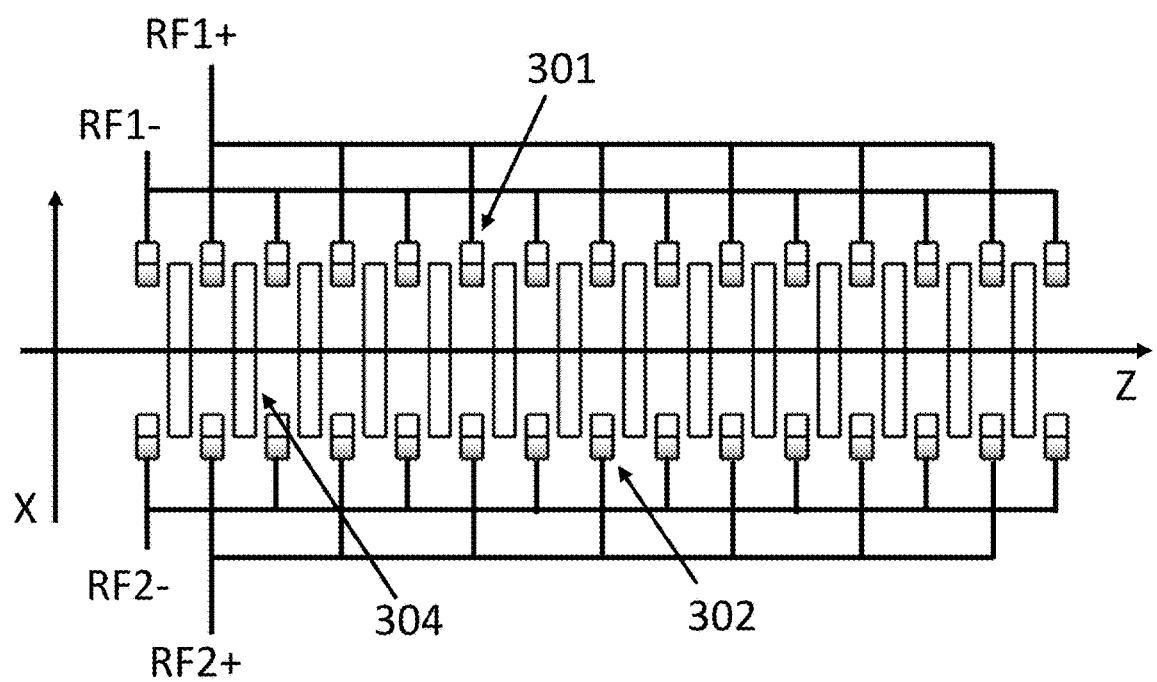
FIG. 3B is a schematic side view of the electrodes of the RF-device of FIG. 3A showing the application of RF-potentials thereto.

FIG. 3B shows a schematic side view (x-z plane) of the upper electrodes 301, the lower electrodes 302 and right electrodes 304. RF-potentials (RF301, RF302) are applied to the electrodes of the upper and lower sets (301, 302), respectively, but not to the electrodes of right set 304 nor to the electrodes of the left set 303 (not shown). As explained above, the electrodes of the upper set 301 are not interdigitated with the lower electrodes 302 along the z-direction, but the electrodes of the left and right sets (303, 304) are placed between the electrodes of the upper and lower sets (301, 302). In contrast to the above embodiments, the electrode sets 301, 302 to which RF-potentials are applied to do not completely encompass the ion region 310, but only the upper and lower boundaries of the ion region 310.

The first RF-potential (RF1) is applied to the upper electrodes 301 and the second RF-potential (RF2) is applied to the lower electrodes 302. As shown in FIG. 3B, for each of the RF-potentials, two opposite phases are used. For example, a first phase of RF1 (RF1−) is applied to every odd-numbered upper electrode (301-1, 301-3, . . . ), while an opposite phase, RF1+(which is 180° out of phase with RF1−) is applied to the even-numbered upper electrodes (301-2, 301-4, . . . ). Similarly, a first phase of RF2 (RF2−) is applied to every odd-numbered lower electrode (302-1, 302-3, . . . ), while an opposite phase, RF2+, is applied to the even-numbered lower electrodes (302-2, 302-4, . . . ). Ions are therefore confined inside the ion region 310 by a pseudo-potential only along the x-direction, but not (or in only a very limited manner) along the y-direction. An important advantage of applying RF potentials of two different frequencies to the electrode structures of both boundaries is that substantially no pseudo-potential wells are produced inside the ion region along the longitudinal axis.

Figure 3C:
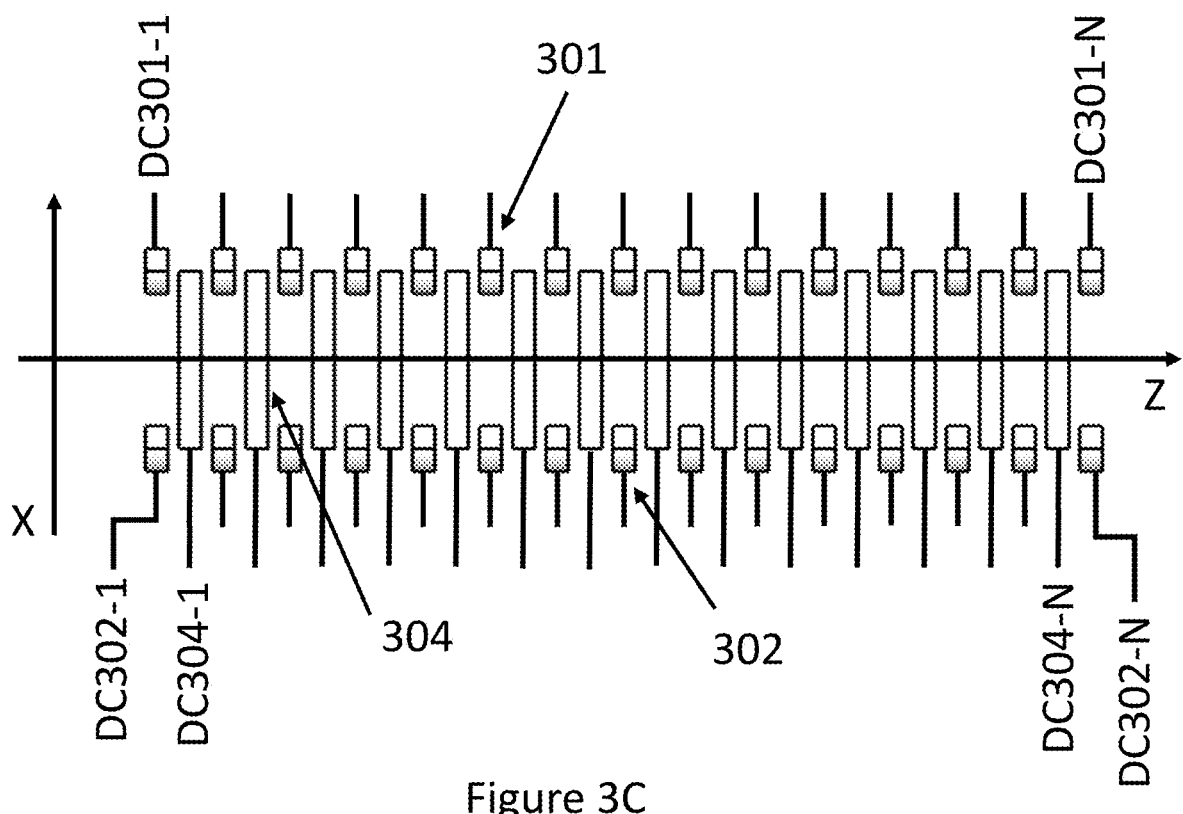
FIG. 3C is a schematic side view of the electrodes of the RF-device of FIG. 3A showing the application of DC-potentials thereto.

FIG. 3C shows a schematic side view (x-z plane) of the upper electrodes 301, the lower electrodes 302, and the right electrodes 304 of the embodiment of FIG. 3A. DC-potentials (DC304-1, . . . DC304-N) are applied to the electrodes of the right set 304 and DC-potentials (DC303-1, . . . DC303-N) are applied to the electrodes of the left set 303 (not shown).

DC-potentials (DC301-1 to DC301-N) and (DC302-1 to DC302-N) can also be applied to the upper and lower electrodes (301, 302) for actively guiding ions through the RF-device 300, for accelerating ions into or inside the RF-device 300 or for trapping ions inside the RF-device 300 along the axis.

The DC-potentials (DC303, DC304) applied to the left and right electrodes (303, 304) are repelling and used to transversely confine ions in the ion region 310 along the y-direction. Preferably, the DC-potentials applied to the left and right electrodes (303, 304) have an offset relative to those DC-potentials applied to their directly neighboring upper and lower electrodes such that ions are transversely confined along the y-direction while the DC-potential on the upper and lower electrodes (301, 302) is changing along the axis, for example to drive or trap ions. This offset can be constant or can vary along the axis. The DC-potential applied to the nth electrode of the right set 304 is preferably equal to the DC-potential applied to the nth electrode of the left set 303.

The RF-device 300 can be filled with gas and used as a cell for fragmenting ions by collisional induced dissociation (CID). By applying a DC-voltage between an upstream component (not shown) and electrodes at the entrance of the RF-device 300, ions can be axially accelerated into the RF-device 300 and fragmented by collision with gas molecules inside the RF-device 300. The ions can also be accelerated inside the RF-device 300 by applying appropriate DC-potentials to electrodes of the RF-device 300 along its axis.

The RF-device 300 can also be used as an RF-ion guide or RF-ion trap. DC-potentials can be applied to the electrodes (301 to 304) to drive ions, that are introduced into the RF-device 300 or generated inside the RF-device 300, through the RF-device 300 to the exit, especially when it is filled with damping gas or used as CID fragmentation cell. By applying appropriate DC-potentials at electrodes of the RF-device 300, ions introduced into the RF-device 300 or generated inside the RF-device 300 can be trapped inside the RF-device 300. The RF-device 300 can also be used as an ion mobility separator, especially as a trapped ion mobility separator.

The DC-potentials applied to the electrodes of the RF-device 300 can be time dependent to vary the fragmentation energy for CID or to vary the velocity of the ions inside the RF-device 300 in time. The DC-potentials can, for example, be transient DC-potentials for generating a travelling wave inside the RF-device 300. The DC-potentials applied to electrodes 301, 302, 303 and 304 can be generated via a resistor chain or by individual DC power supplies.

Figure 3D:
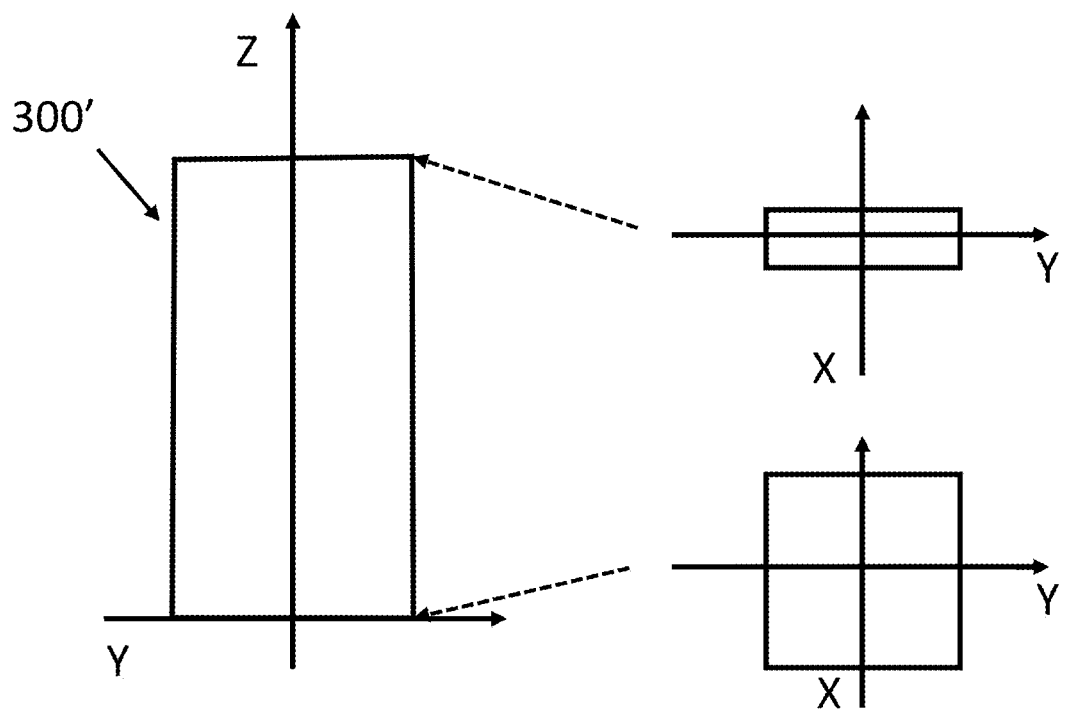
FIG. 3D is a schematic view of a version of the embodiment of FIG. 3A in which the cross-sectional profile of an ion region changes along the z-direction.

FIG. 3D shows a schematic of an ion region of an RF-device 300' in the y-z plane as well as in the x-y plane at the entrance and exit of the RF-device 300'. The RF-device 300' is similar to the RF-device 300 of FIG. 3A, but the cross-sectional profile is not constant along the z-direction, instead varying from a square cross-sectional profile at the entrance to a rectangular cross-sectional profile at the exit. The extension of the ion region along the y-direction stays constant, while the extension along the x-direction decreases, which results in a spatial focusing of ions along the x-direction. The RF-device 300' can be used as an DC/RF ion funnel. The cross-sectional profile can vary also in both transverse directions.

Figure 4A:
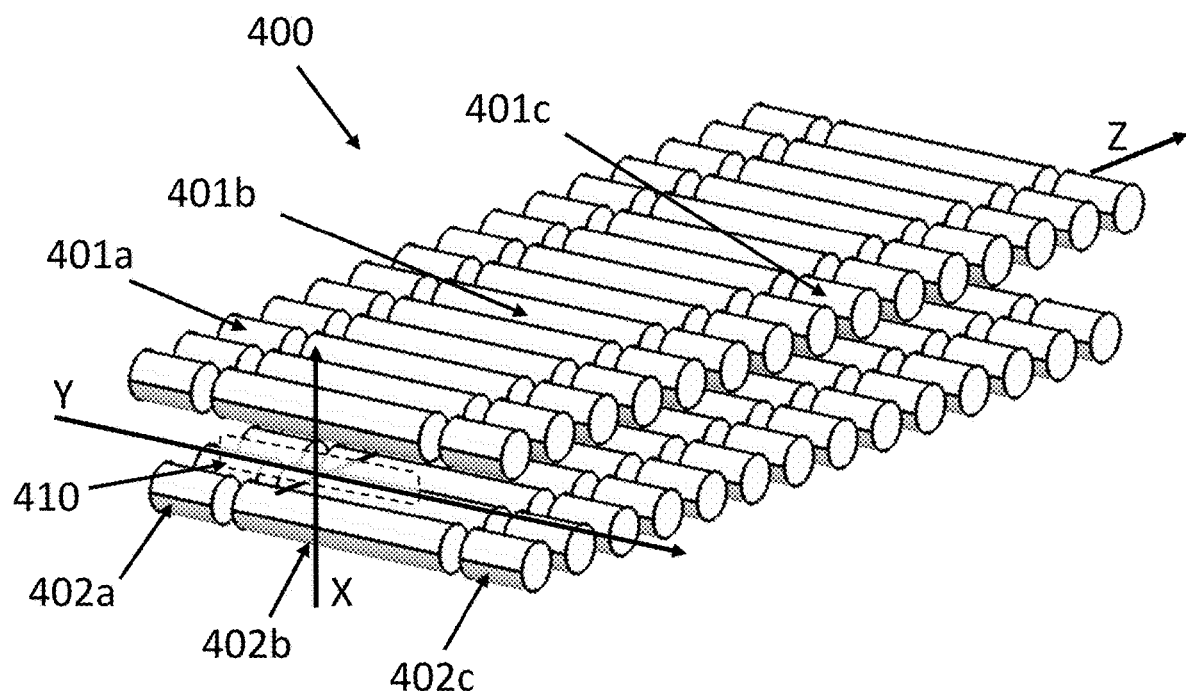
FIG. 4A shows a fourth embodiment of a RF-device according to the invention wherein the ion region is not completely encompassed by the electrodes of the RF-device.
Figure 4B:
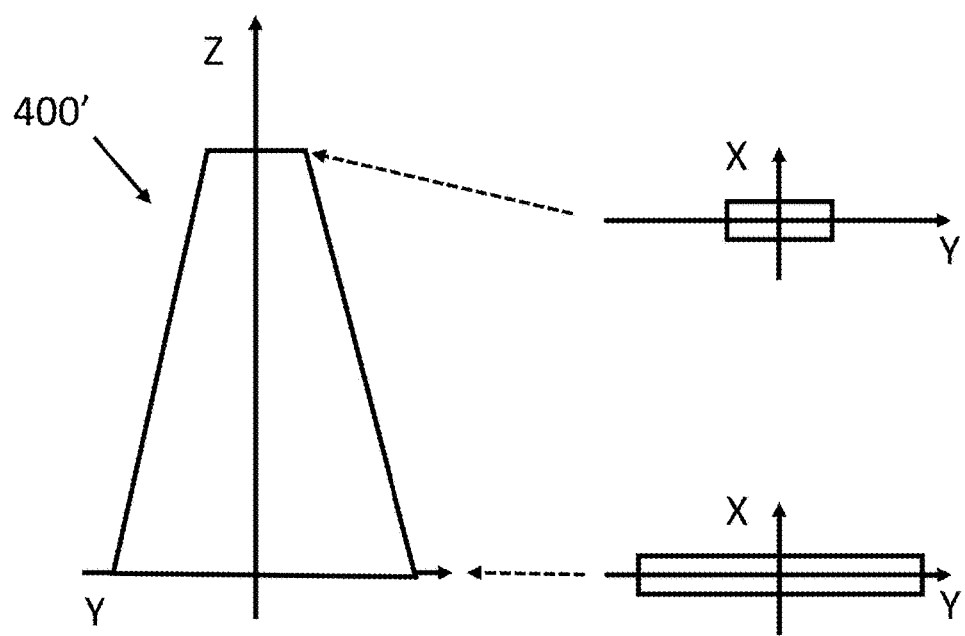
FIG. 4B is a schematic view of a version of the embodiment of FIG. 4A in which the cross-sectional profile of an ion region changes along the z-direction.

A fourth embodiment of an RF-device according to the invention is shown in FIGS. 4A and 4B.

FIG. 4A shows a RF device 400 which comprises an upper set of electrodes 401 (401a, 401b, 401c) and a lower set of electrodes 402 (402a, 402b, 402c) which are arranged in a stack along the axis (z-direction) of the RF-device 400. The RF-device 400 has an ion region 410 having a rectangular cross-sectional profile perpendicular to the z-direction which is more extended in the y-direction than in the x-direction, and which does not vary along the longitudinal axis of the RF-device 400.

The upper and lower set (401, 402) each comprises an elongate electrode set (401b, 402b) between a left electrode set (401a, 402a) and a right electrode set (401c, 402c). Each electrode of the two sets (401, 402) is segmented and comprises an elongate electrode between two short extensions which are all arranged in line along the y-direction. In contrast to the embodiments above, the ion region 400 is not completely encompassed by the upper and lower set (401, 402). The ion region 400 is limited by the upper and lower electrode set (401, 402) along the x-direction and to the extent of the elongate electrode sets (401b, 402b) along the y-direction. The electrodes of the upper set (401a, 401b, 401c) are preferably offset with the electrodes of the lower set (402a, 402b, 402c) along the z-direction.

In this embodiment, the electrodes of the upper and lower set (401, 402) are rod-shaped with a circular cross section. In other embodiments, the cross-sectional shape of the electrodes of the two sets need not be circular. The rod-shaped electrodes can, for example, have a rounded surface only on a side facing the ion region 410. The segments of an electrode can be simplified as three thin conductive plates or can be manufactured as metallized parts of a PCB board. The thin conductive plates and PCB boards are then arranged in a stack along the axis.

Two different RF-potentials with different frequencies are applied to the upper and lower elongate electrodes (401b, 402b). The first RF-potential RF1 is applied to the upper elongate electrodes 401b and the second RF-potential RF2 is applied to the lower elongate electrodes 402b. A first phase of RF1 is applied to every odd-numbered elongate upper electrode, while an opposite phase is applied to even-numbered elongate upper electrodes. Similarly, a first phase of RF2 is applied to every odd-numbered elongate lower electrode, while an opposite phase is applied to even-numbered elongate lower electrodes. Ions are therefore confined inside the ion region 410 by a pseudo-potential only along the x-direction, but not along the y-direction. Preferably, the RF-potential applied to the elongate segment of an electrode is also applied to the short extension segments.

An important advantage of applying RF potentials of two different frequencies to the elongate upper and lower electrodes (401b, 402b) is that substantially no pseudo-potential wells are produced inside the ion region along the axis.

DC-potentials are applied to the left electrode sets (upper 401a, lower 402a) and to the right electrode sets (upper 401c, lower 402c). DC-potentials can also be applied to the elongate electrode sets (upper 401b, lower 402b) for actively guiding ions through the RF-device 400, for accelerating ions into or inside the RF-device 400 or trapping ions inside the RF-device 400 along the axis.

The DC-potentials applied to the left and right electrode sets (401a, 402a, 401c, 402c) are repelling and used to transversely confine ions in the ion region 410 along the y-direction. Preferably, the DC-potentials applied to the left and right electrode sets (401a, 402a, 401c, 402c) have an offset relative to those DC-potentials applied to their directly neighboring elongate electrodes such that ions are transversely confined along the y-direction even if the DC-potential on the elongate electrode sets (401b, 402b) is changing along the axis, for example to drive or trap ions along the axis. This offset can be constant or vary along the axis. The DC-potentials applied to the nth electrodes in the stack of the left and right sets (401a, 402a, 401c, 402c) are preferably the same.

The DC-potentials applied to the electrodes of the RF-device 400 can be time-dependent, e.g., to vary the fragmentation energy for CID or to vary the velocity of the ions inside the RF-device 400 in time. The DC-potentials can, for example, be transient DC-potentials for generating a travelling wave inside the RF-device 400. The DC-potentials applied to electrodes 401a, 402a, 401b, 402b, 401c and 402c can be generated via a resistor chain or by individual DC power supplies.

The RF-device 400 can be used as a RF-ion guide, a RF-ion trap, a fragmentation cell, an ion mobility separator, especially as a trapped ion mobility separator, or in an ion accelerator/reflector of a time-of-flight mass analyzer.

FIG. 4B shows a schematic of an ion region of an RF-device 400' in the y-z plane as well as in the x-y plane at the entrance and exit of the RF-device 400'. The RF-device 400' is similar to the RF-device 400 of FIG. 4A, but the cross-sectional profile is not constant along the z-direction, instead varying from a more elongated cross-sectional profile at the entrance to a less elongated cross-sectional profile at the exit. The extension of the ion region along the x-direction stays constant, while the extension along the y-direction decreases, which results in a spatial focusing of ions along the y-direction. The RF-device 400' can therefore be used as an DC/RF-ion funnel. The cross-sectional profile can vary also in both transverse directions.

Figure 5A:
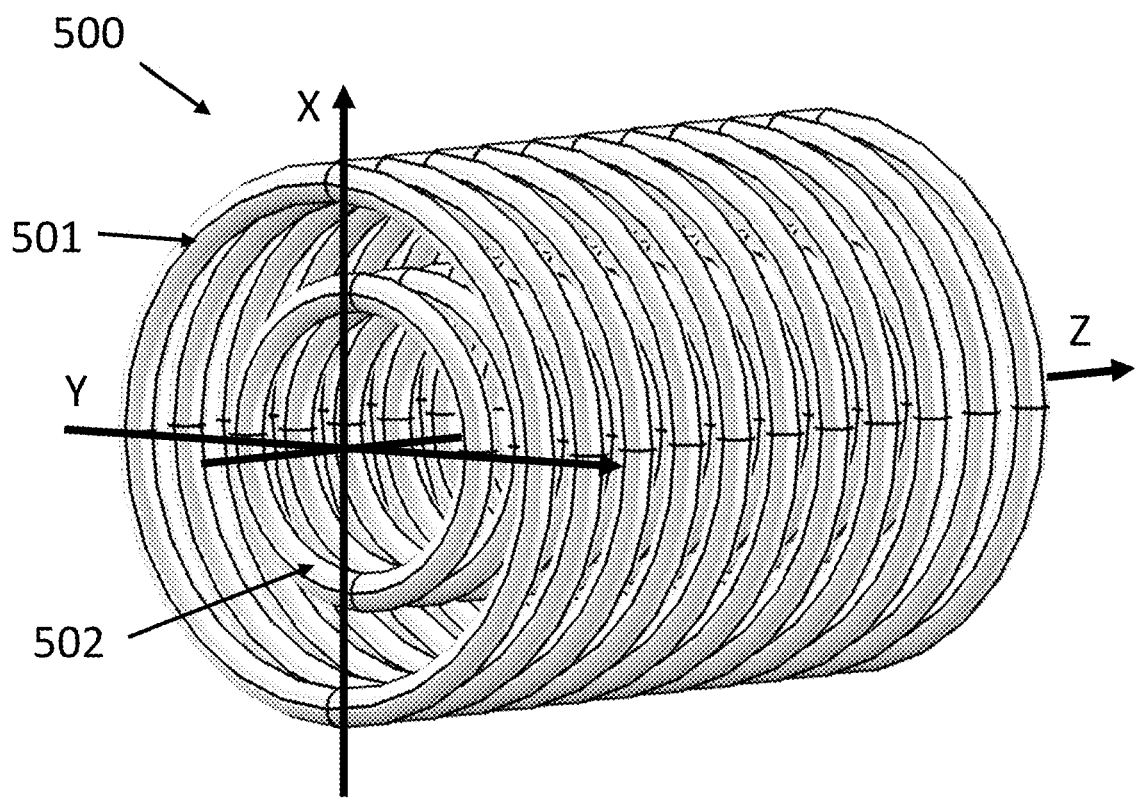
FIG. 5A shows a fifth embodiment of a RF-device according to the invention wherein the ion region is non-convex and has an annular shape defined by the space between coaxially aligned inner and outer electrodes.
Figure 5B:
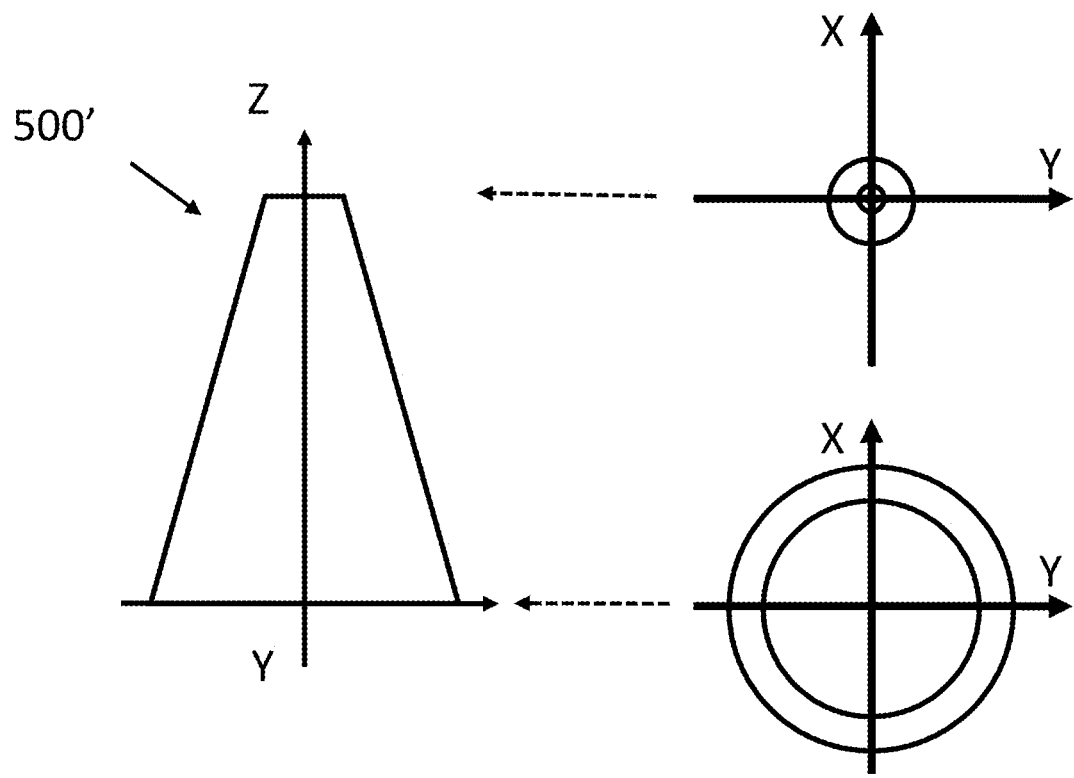
FIG. 5B is a schematic view of a version of the embodiment of FIG. 5A in which the cross-sectional profile of an ion region changes along the z-direction.

A fifth embodiment of a RF-device according to the invention is shown in FIGS. 5A and 5B.

FIG. 5A shows a RF-device 500 which comprises an outer set of ring electrodes 501 and an inner set of ring electrodes 502, which are arranged in a stack along the axis (z-direction) of the RF-device 500. The ion region is defined as the space between the coaxially aligned inner and outer electrodes (501, 502). The cross-sectional profile does not vary along the longitudinal axis of the RF-device 500. The outer electrodes 501 are preferably offset with the inner electrodes 502 along the z-direction.

In this embodiment, the cross-sectional profile of each of the rings of the inner and outer electrode sets (501, 502) is circular. In other embodiments, the cross-sectional profile of the electrodes need not be circular. The form of the electrodes could, for example, be only rounded on a side that faces the ion region. The electrodes of the outer set could also have the form of conductive plates with a round aperture, while the electrodes of the inner set could have the form of round conductive plates. The electrodes of the inner and outer sets can also be metallized parts of a PCB board. The conductive plates and PCB boards can then be arranged in a stack along the axis.

Two different RF-potentials with different frequencies are applied to the inner and outer electrodes (501, 502). The first RF-potential RF1 is applied to the outer electrodes 501 and the second RF-potential RF2 is applied to the inner electrodes 502. A first phase of RF1 is applied to every odd-numbered outer electrode, while an opposite phase is applied to even-numbered outer electrodes. Similarly, a first phase of RF2 is applied to every odd-numbered inner electrode, while an opposite phase is applied to even-numbered inner electrodes. Ions are therefore confined inside the ion region by a pseudo-potential between the inner and outer electrodes. As described in the embodiments above, DC-potentials can be applied to the electrodes of the inner and outer electrodes (501, 502).

In contrast to the embodiments above, the cross-sectional profile of the ion region in the embodiment of FIG. 5A is non-convex, i.e., for any given two points inside the cross-sectional profile of the ion region, not all points along a line segment between the two points lie also inside the cross-sectional profile. The advantage of a non-convex cross-sectional profile is that the influence of one charged ion on another will be reduced and the number of ions which can be trapped is increased.

The RF-device 500 can, for example, be used as an RF-ion guide, an RF-ion trap, a fragmentation cell, an ion mobility separator, and especially as a trapped ion mobility separator.

FIG. 5B shows a schematic of an ion region of an RF-device 500' in the y-z plane as well as in the x-y plane at the entrance and exit of the RF-device 500'. The RF-device 500' is similar to the RF-device 500 of FIG. 5A, but the cross-sectional profile is not constant along the z-direction, varying instead such that the annular space decreases in both transverse directions, which results in a spatial focusing of ions.

Figure 6A:
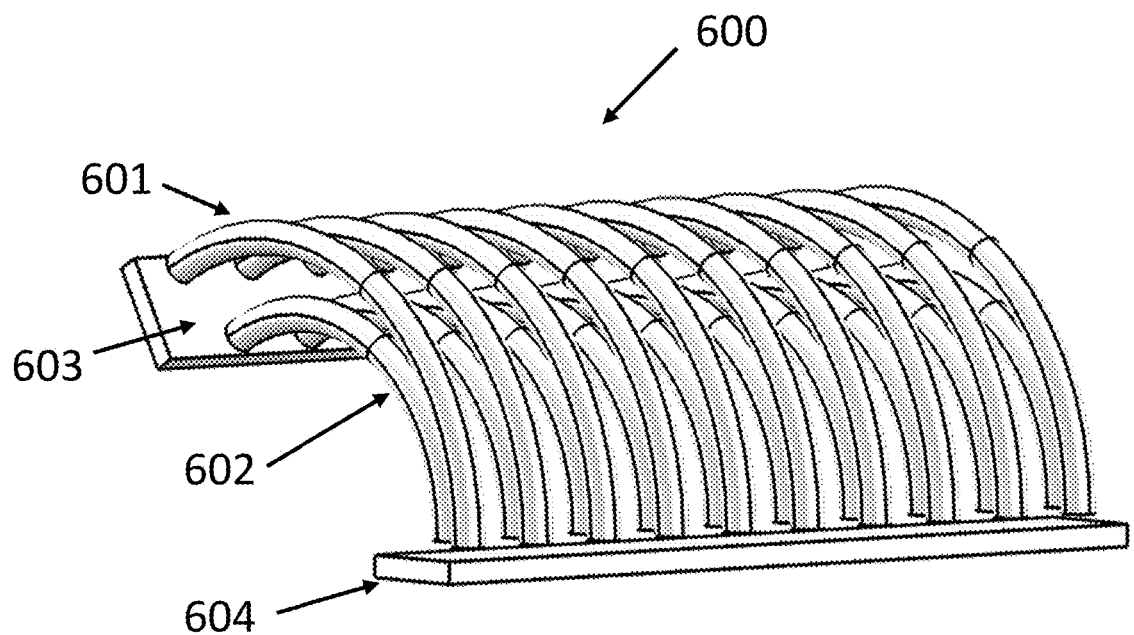
FIG. 6A shows a sixth embodiment a RF-device according to the invention wherein the ion region is non-convex and has generally arcuate shape.
Figure 6B:
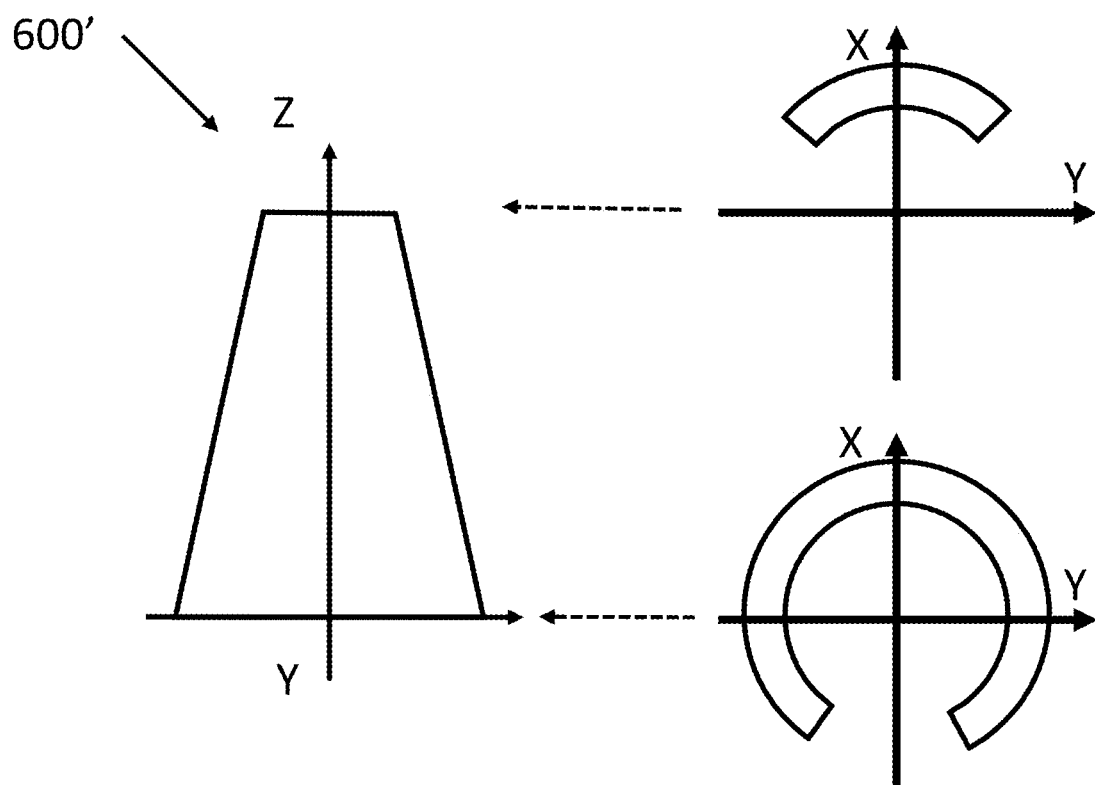
FIG. 6B is a schematic view of a version of the embodiment of FIG. 6A in which the cross-sectional profile of an ion region changes along the z-direction.
Figure 6C:
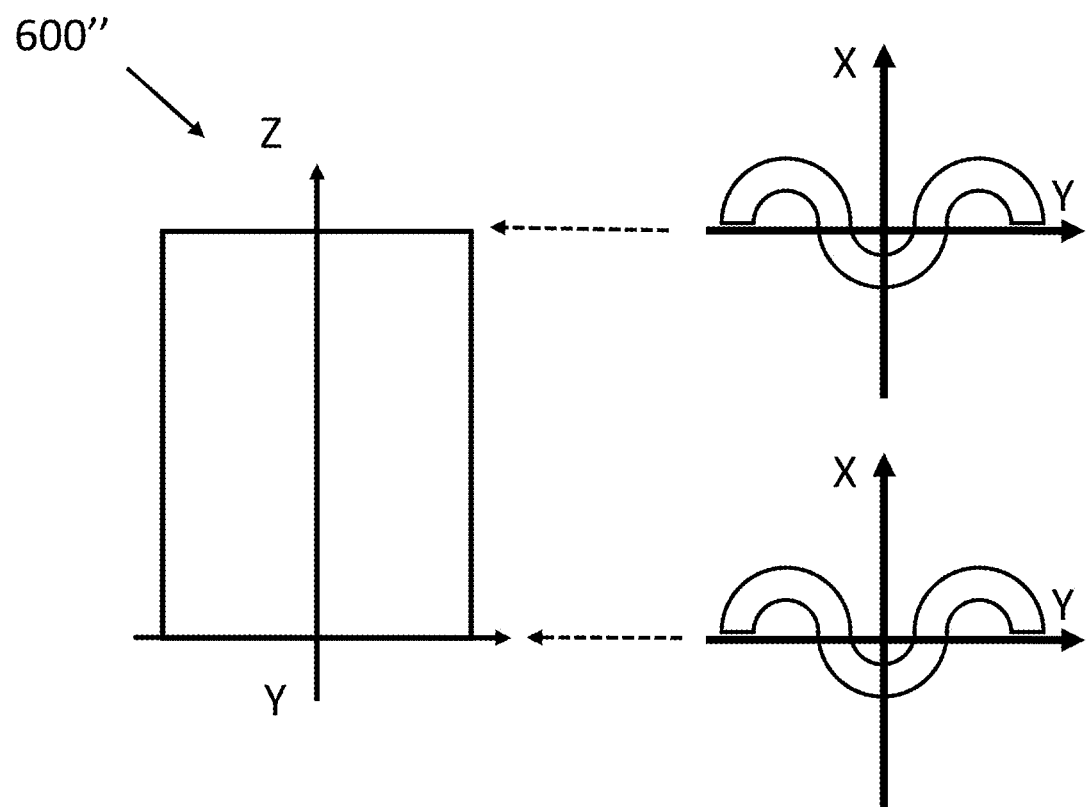
FIG. 6C is an embodiment of an RF-device with an ion region that is non-convex and that has a generally serpentine shape.

A sixth embodiment of a RF-device according to the invention is shown in FIGS. 6A to 6C.

FIG. 6A shows an RF-device 600 which comprises an outer set of arcuate electrodes 601 and an inner set of arcuate electrodes 602 which are arranged in a stack along the axis (z-direction) of the RF-device 600. The inner arcuate electrodes 601 are preferably offset relative to the outer arcuate electrodes 602 along the z-direction. An electrode 603 extending parallel to the longitudinal axis of the RF-device 600 is located at one end of the two actuate electrode sets (601, 602), and an electrode 604 is located at the other end of the two arcuate electrode sets (601, 602). The ion region is defined as the space between the coaxially aligned arcuate electrodes (601, 602) bounded by the axially extended electrodes 603 and 604. The cross-sectional profile of the ion region does not vary along the longitudinal axis of the RF-device 600.

In this embodiment, the electrodes of the inner and outer set (601, 602) are curved with a circular cross section although, in an alternative embodiment, the cross section of the electrodes may be rounded only on a side that faces the ion region (e.g., with a semi-circular cross section). The electrodes of the inner and outer set (601, 602) can be replaced by conductive plates or can be metallized parts of a PCB board. The conductive plates and PCB boards could then be arranged in a stack along the axis. The extended electrodes (603, 604) can be segmented and also be metallized parts of the same PCB boards as the inner and outer arcuate electrodes.

Two different RF-potentials with different frequencies are applied to the inner and outer arcuate electrodes (601, 602). The first RF-potential RF1 is applied to the outer electrodes 601 and the second RF-potential RF2 is applied to the inner electrodes 602. A first phase of RF1 is applied to every odd-numbered outer arcuate electrode, while an opposite phase is applied to even-numbered outer arcuate electrodes. Similarly, a first phase of RF2 is applied to every odd-numbered inner arcuate electrode, while an opposite phase is applied to even-numbered inner arcuate electrodes. Repelling DC-potentials are applied to the extended electrodes (603, 604). Ions are confined inside the ion region by a pseudo-potential generated by the arcuate RF-electrodes (601, 602) and by the DC-potential applied to the extended electrodes (603, 604). As described in the embodiments above, DC-potentials can also be applied to the arcuate electrodes (601, 602).

As in the embodiment shown in FIGS. 5A and 5B, the cross-sectional profile of the ion region is non-convex. The advantage of a non-convex cross-sectional profile is that the influence of one charged ion on another will be reduced and the number of ions which can be trapped is increased.

FIG. 6B shows a schematic view of an ion region of an RF-device 600' in the y-z plane as well as in the x-y plane at the entrance and exit of the RF-device 600'. The RF-device 600' is similar to the RF-device 600 of FIG. 6A, but the cross-sectional profile is not constant along the z-direction, the device instead having an azimuthal angle of the arcuate space that decreases along the longitudinal axis of the RF-device.

FIG. 6C shows a schematic view of an ion region of another RF-device 600" in the y-z plane as well as in the x-y plane at the entrance and exit of the RF-device 600". Here, the cross-sectional profile does not vary along the longitudinal axis of the RF-device 600" and comprises three arcuate portions of the same curvature forming a serpentine. The electrodes defining the upper and lower boundaries can be like those shown in the embodiment of FIG. 6A. The ions are confined between the upper and lower boundary by applying two RF-potentials with different frequencies to the upper and lower electrodes. Additional electrodes are located at each of the two ends of the serpentine to which repelling DC potentials can be applied to as shown in shown in the embodiment of FIG. 6A.

Figure 7:
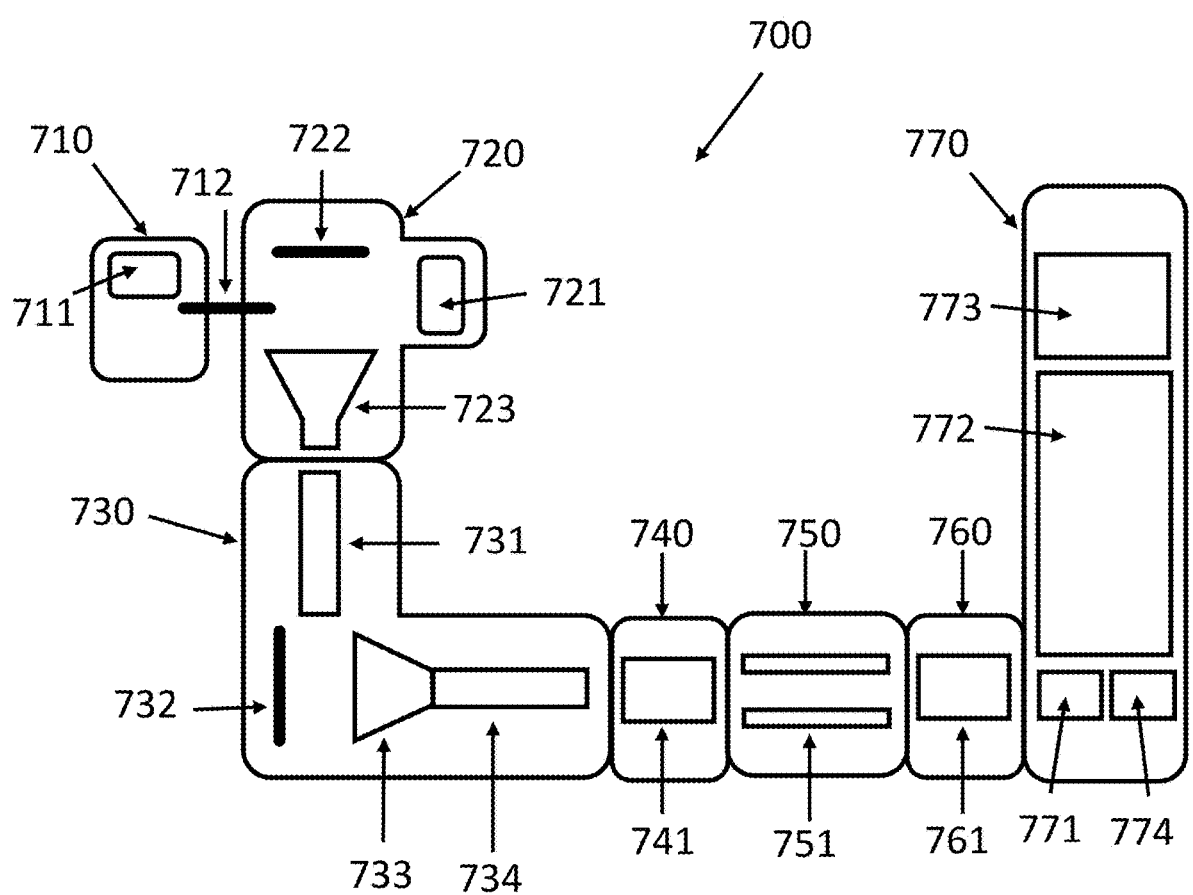
FIG. 7 shows a mass spectrometric system comprising at least one RF-device according to the invention.

FIG. 7 is a schematic diagram of a mass spectrometric system 700 wherein an RF-device according to the invention can be used in different components of the mass spectrometric system 700.

The mass spectrometric system 700 can comprise two ion sources (711, 721), an ion mobility separator 734, a transfer ion guide 741, a mass filter 751, a fragmentation cell 761, and a mass analyzer 770. The ion mobility separator 734 is preferably a trapped ion mobility separator (TIMS), more preferably a laterally extended TIMS as described in FIGS. 1A to 1G and 2A to 2E. The TIMS separator 734 is preferably operated in a parallel accumulation mode, i.e., such that ions are accumulated in an upstream ion trap 731 while pre-accumulated ions are analyzed in the TIMS separator 734 parallel in time. The mass filter 751 is preferably a quadrupole mass filter. The mass analyzer 770 is preferably a time-of-flight analyzer with orthogonal ion injection (OTOF-MS). A separation device (not shown), such as a liquid chromatography device or an electrophoretic device, can be coupled to the mass spectrometric system 700.

The chamber 710 is held at atmospheric pressure and incorporates, for example, an electrospray ion source 711 (ESI). Other possible ion source types include thermal spray, desorption ionization (e.g., matrix-assisted laser desorption/ionization (MALDI) or secondary ionization), chemical ionization (CI), photo-ionization (PI), electron impact ionization (EI), and gas-discharge ionization. Ions generated by the (ESI) ion source 711 are introduced via a transfer capillary 712 into a first vacuum chamber 720 and then deflected into a RF-funnel 723 by a repelling electric DC potential which is applied to a deflector electrode 722. The transfer capillary is preferably a short wide bore capillary with an inner diameter of 1 mm or more and a length of 180 mm or less.

The vacuum chamber 720 is preferably held at an elevated pressure between 1000 Pa and 3000 Pa and comprises preferably a sub-ambient ESI ion source 721. Ions generated by the sub-ambient ESI source 721 are deflected by a repelling electric DC-potential applied to the deflector electrode 722 into the RF-funnel 723. An additional MALDI source can be located at the position of the deflector electrode 722. The ESI ion sources 711 and 721 as well as the additional MALDI source can be operated simultaneously or separately from each other. The RF-funnel 723 can, for example, be an RF-device according to the invention, e.g., as shown in one of FIG. 2E, 3D, 4B, 5B or 6B. The ions can, for example, be driven through the RF-funnel 723 by an axial DC field generated inside the RF-funnel 723 or by a gas flow towards the exit of the RF-funnel 723.

The vacuum chamber 730 is preferably held at a lower pressure than the pressure of the upstream chamber 710, e.g., at a pressure between 100 Pa and 1000 Pa. A gas flow towards the exit of the RF-funnel 723 can be generated by pumping away gas from the chamber 720 through an aperture between the two chambers (720, 730). Ions are transmitted from the chamber 720 through the inter-chamber aperture into the ion trap 731. The ion trap 731 is preferably an RF-device according to the invention, e.g., as described in FIG. 3A or 4A. The cross-sectional profile as well as the length of the ion trap 731 is preferably adapted to the cross-sectional profile and length of the downstream ion mobility separator 734, especially when the ion mobility separator 734 is a laterally extended TIMS. As described above, ions can be trapped in the ion trap 731 and then actively driven out of the ion trap by an axial DC-field. A repelling electric DC-potential applied to a deflector electrode 732 deflects the ions, which are released from or transmitted through the ion trap 731, into RF-funnel 733. An additional MALDI source can be located at the position of the deflector electrode 732.

The RF-funnel 733 collects the ions released from the ion trap 731 or generated by the additional MALDI source in the chamber 730 and guides them to the ion mobility separator 734. The ion mobility separator is preferably a laterally extended TIMS as described in FIGS. 1A to 1G and 2A to 2E. Preferably, the two opposing forces of the laterally extended TIMS 734 are a gas flow directed to the exit of the laterally extended TIMS 734 and a DC-field gradient.

The gas flow in the laterally extended TIMS 734 is generated by pumping away gas from the exit of the laterally extended TIMS 734 through a pumping port (not shown) and through an aperture between the two chambers (730, 740).

During an accumulation phase, the two opposing forces are balanced such that, for each ion species of interest, an equilibrium point of zero velocity exists within the laterally extended TIMS 734. During a subsequent elution phase, the trapped ion species are eventually released from the laterally extended TIMS 734 by changing the DC-field gradient such that the ion species in the laterally extended TIMS 734 are sequentially eluted according to their mobility K. This relative change in the opposing axial forces may be progressive, such that ion species of increasing mobility K successively exit the laterally extended TIMS 734.

The ions released from the laterally extended TIMS 734 enter the downstream chamber 740 and are guided by RF-ion guide 741 into the further downstream chamber 750 in which the mass filter 751 is located. The RF-ion guide 741 can, for example, be an RF-device according to the invention, e.g., as described in FIGS. 4A and 4B. The chamber 740 serves as a pressure stage between the medium vacuum of the laterally extended TIMS 734 and the high vacuum under which the mass filter 751 is operated. Ions are guided or selected according to mass in the mass filter 751.

The ions that pass through the mass filter 751 are then directed to a fragmentation cell 761 in chamber 760 in which larger ions can be fragmented to allow mass spectrometric measurement of the ion fragments. In the exemplary embodiment, fragmentation is done using collision induced dissociation (CID). However, any other known type of fragmentation may also be used including, but not limited to, infrared multiple photon-dissociation (IRMPD) or ultraviolet photo-dissociation (UVPD), surface induced dissociation (SID), photo-dissociation (PD), electron capture dissociation (ECD), electron transfer dissociation (ETD), collisional activation after electron transfer dissociation (ETcD), activation concurrent with electron transfer dissociation (AI-ETD) and fragmentation by reactions with highly excited or radical neutral particles.

The fragmentation cell 761 can, for example, comprise an RF-device according to the invention, e.g., as described in FIGS. 4A and 4B. The fragmentation by CID can be switched on and off, controlled by instrumental parameters, e.g., an axial acceleration voltage. Precursor ions can be trapped in the fragmentation cell 761 without being fragmented, as well as fragment ions when fragmentation is enabled. DC-potentials can be applied to electrodes of the fragmentation cell 761 to generate an axial DC-field for ejecting trapped ions into the downstream mass analyzer 770 which may be any of a number of different types of mass analyzers.

In the exemplary embodiment, the mass analyzer 770 is a time-of-flight mass analyzer with orthogonal ion injection, as is known in the art. Other possible mass analyzers include an electrostatic ion trap, an RF ion trap, an ion cyclotron frequency ion trap and a quadrupole mass filter. The time-of-flight mass analyzer 770 comprises an accelerator 771, a flight path 772, a reflector 773 and an ion detector 774. The flight path 772 is preferably field free. An additional reflector can be located between the accelerator 771 and the ion detector 774 such that the ions are reflected twice in the reflector 773 and move on w-shaped trajectories instead of v-shaped trajectories. The RF-device according to the invention can be incorporated in the accelerator 771, the flight path 772 and/or in the reflector 773.

The invention claimed is:

1. An RF-device for transversely confining ions in an ion region comprising:
   a first set of electrodes that are arranged parallel to one another along a direction of ion travel to define a first transverse boundary of the ion region, and that are supplied with a first RF-voltage such that opposite phases of the first RF-voltage are applied to adjacent electrodes of the first set; and
   a second set of electrodes that are arranged parallel to one another along said direction of ion travel to define a second transverse boundary of the ion region, and that are supplied with a second RF-voltage such that opposite phases of the second RF-voltage are applied to adjacent electrodes of the second set;
   wherein the first and second transverse boundaries are opposite each other in a transverse direction of the ion region and wherein the first RF voltage and the second RF voltage have different frequencies.

2. The RF-device according to claim 1, wherein frequencies of the first and second RF voltages differ by more than 10%.

3. The RF-device according to claim 1, wherein the electrodes of each of the first and the second sets have a relative spacing S along the direction of ion travel and the first and second transverse boundaries have a relative distance D from each other in the transverse direction, and wherein a ratio D/S is less than ten in at least one portion of the RF-device along the direction of ion travel.

4. The RF-device according to claim 1, wherein the electrodes of the first set have a relative spacing equal to a relative spacing of the electrodes of the second set, and wherein, relative to the electrodes of the first set, positioning of the electrodes of the second set along the direction of ion travel is offset by a predetermined amount.

5. The RF-device according to claim 1, wherein the electrodes of the first and second set together encompass a cross-sectional profile of the ion region.

6. The RF-device according to claim 5, wherein the electrodes of the first set are at least partially interdigitated with the electrodes of the second set in an overlap area.

7. The RF-device according to claim 1, wherein the electrodes of the first and second set do not completely encompass a cross-sectional profile of the ion region, and wherein additional electrodes or electrode segments are provided and supplied with repelling DC-potentials to transversely confine ions in sections of the ion region that are not bordered by the electrodes of the first or second set.

8. The RF-device according to claim 7, wherein DC-potentials are applied to electrodes of the first or second set and wherein the repelling DC-potentials applied to the additional electrodes or electrode segments have an DC offset relative to DC-potentials applied to proximate electrodes of the first and second set.

9. The RF-device according to claim 1, wherein multiple electrodes of the first and/or the second set have a rod-like portion with a round cross-section.

10. The RF-device according to claim 9, wherein a ratio between a diameter of the round cross-section and a spacing of adjacent rod-like portions is about two to three (2/3).

11. The RF-device according to claim 1, wherein a cross-sectional profile of the ion region is convex.

12. The RF-device according to claim 1, wherein a cross-sectional profile of the ion region is non-convex.

13. The RF-device according to claim 1, wherein the ion region has an elongate cross-sectional profile perpendicular to the direction of ion travel with a long dimension and a short dimension.

14. The RF-device according to claim 1, wherein a cross-sectional profile of the ion region varies along the direction of ion travel.

15. The RF-device according to claim 14, wherein the cross-sectional profile at an entrance of the RF-device is larger than at an exit thereof.

16. The RF-device according to claim 1, further comprising a DC-generator that is configured to apply repelling DC-potentials to electrodes of the first and/or second set near an entrance and an exit of the ion region such that ions are temporarily trapped inside the ion region along the direction of ion travel.

17. The RF-device according to claim 1, further comprising a DC-generator that is configured to apply DC-potentials to the electrodes of the first and/or second set along the direction of ion travel such that ions are urged through the ion region, accelerated inside or into the ion region or released from the ion region.

18. A mass spectrometric system comprising:
   an ion source;
   a mass analyzer; and
   an RF-device for transversely confining ions in an ion region comprising:
      a first set of electrodes that are arranged parallel to one another along a direction of ion travel to define a first boundary of the ion region and that are supplied with a first RF-voltage such that opposite phases of the first RF-voltage are applied to adjacent electrodes of the first set; and
      a second set of electrodes that are arranged parallel to one another along said direction of ion travel to define a second boundary of the ion region, and that are supplied with a second RF-voltage such that opposite phases of the second RF-voltage are applied to adjacent electrodes of the second set;
      wherein the first and second transverse boundaries are opposite each other in a transverse direction of the ion region and wherein the first RF voltage and the second RF voltage have different frequencies.

19. The mass spectrometric system according to claim 18, wherein the electrodes of each of the first and the second sets have a relative spacing S along the direction of ion travel and the first and second boundaries have a relative distance D from each other in the transverse direction, and wherein a ratio D/S is less than ten in at least one portion of the RF-device along the direction of ion travel.

20. The mass spectrometric system according to claim 18, wherein the electrodes of the first set have a relative spacing equal to a relative spacing of the electrodes of the second set, and wherein, relative to the electrodes of the first set, positioning of the electrodes of the second set along the direction of ion travel is offset by a predetermined amount.

21. The mass spectrometric system according to claim 18, further comprising an ion mobility separator between the ion source and the mass analyzer, said ion mobility separator comprising the RF-device.

22. The mass spectrometric system according to claim 21, wherein the ion mobility separator further comprises a gas flow along the direction of ion travel and a DC voltage generator,
- wherein the DC voltage generator is configured to supply DC-potentials to the electrodes of the first and second sets for generating an electric DC field gradient along the direction of ion travel which counteracts a force of the gas flow such that ions are trapped and separated by ion mobility during an accumulation phase, and
- wherein the DC voltage generator is configured to vary the DC-potentials applied to the electrodes of the first and second sets such that ions are released from the ion mobility separator over time as a function of ion mobility during an elution phase.

23. The mass spectrometric system according to claim 22, wherein the ion region has an elongate cross-sectional profile perpendicular to the direction of ion travel with a long dimension and a short dimension.

24. The mass spectrometric system according to claim 18, further comprising a fragmentation cell between the ion source and the mass analyzer, said fragmentation cell comprising the RF-device.

25. The mass spectrometric system according to claim 24, wherein the fragmentation cell is filled with a collision gas and further comprises a DC voltage generator that is configured to apply DC-potentials to the electrodes of the first and/or second set to accelerate ions into a collision gas, and to urge fragment ions resulting from collision induced dissociation through the ion region.

26. The mass spectrometric system according to claim 18, wherein the mass analyzer is a time-of-flight mass analyzer and comprises the RF-device, which is part of at least one of an accelerator for orthogonally injecting ions, a field free flight path and a reflector.

* * * * *